United States Patent
Boyd et al.

(10) Patent No.: US 6,735,647 B2
(45) Date of Patent: May 11, 2004

(54) DATA REORDERING MECHANISM FOR HIGH PERFORMANCE NETWORKS

(75) Inventors: William Todd Boyd, Poughkeepsie, NY (US); Douglas J. Joseph, Danbury, CT (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 10/235,697

(22) Filed: Sep. 5, 2002

(65) Prior Publication Data

US 2004/0049612 A1 Mar. 11, 2004

(51) Int. Cl.$^7$ .............................................. G06F 13/00
(52) U.S. Cl. ........................ 710/52; 711/144; 712/218; 371/394
(58) Field of Search ................. 370/392, 394; 710/52–55; 711/144; 712/215–219

(56) References Cited

U.S. PATENT DOCUMENTS

| | | | |
|---|---|---|---|
| 5,619,497 A | * 4/1997 | Gallagher et al. | 370/394 |
| 5,737,629 A | * 4/1998 | Zuraski et al. | 712/23 |
| 6,034,963 A | 3/2000 | Minami et al. | 370/401 |
| 6,058,491 A | * 5/2000 | Bossen et al. | 714/15 |
| 6,192,465 B1 | * 2/2001 | Roberts | 712/212 |
| 6,246,684 B1 | * 6/2001 | Chapman et al. | 370/394 |
| 6,335,933 B1 | * 1/2002 | Mallory | 370/394 |
| 6,457,121 B1 | * 9/2002 | Koker et al. | 712/300 |

* cited by examiner

*Primary Examiner*—Christopher B. Shin
(74) *Attorney, Agent, or Firm*—Duke W. Yee; Casimer K. Salys

(57) ABSTRACT

An apparatus and method for reordering data at a data destination is provided. The apparatus and method provides dynamic, adaptive management of receive buffers in a host channel adapter while recovering on the fly the order of data sent over a medium that does not preserve order. In an exemplary embodiment, the method and apparatus provides a method and apparatus of reordering data of a data transmission received from a source device. The method and apparatus receives, in a data transfer buffer, a data packet transmitted over a connection associated with the source device and determines if the connection requires reordering of data packets. If the connection requires reordering of data packets, the data packet is transferred from the data transfer buffer to a reorder buffer and a reorder state cache is updated to reflect the transfer of the data packet to the reorder buffer. In response to receipt of a request to transfer data from the reorder buffer to the host memory, a next data packet sequence number is fetched from the reorder state cache and a position in the reorder buffer of the data associated with the next data packet sequence number entry is identified. The data is at this identified position is then transferred to the host memory.

33 Claims, 16 Drawing Sheets

PLE TO RMAC
REQUEST
200

FIG. 2

| REF | SIZE | NAME | DESCRIPTION |
|---|---|---|---|
| 201 | 2 | OP | 00=TRANSFER PACKET<br>01=READ REORDER STATE<br>10=SET NEXT EXPECTED SEQUENCE NUMBER<br>11=EVICT RSC ENTRY |
| 202 | 6 | PAYLOAD OFFSET | THE OFFSET OF THE PACKET PAYLOAD IN THE DTB SLOT IN 4 BYTE UNITS |
| 203 | 8 | TASK ID | PE TASK ID |
| 204 | 2 | REORDER TYPE | 00=NONE<br>01=WHOLE PACKET<br>10=FRAGMENTED PACKET<br>11=BYTE STREAM |
| 205 | 14 | RSC INDEX | REORDER STATE CACHE INDEX |
| 206 | 1 | RSC MISS | 0=RSC HIT<br>1=RSC MISS |
| 207 | 15 | XFER SIZE | TRANSFER SIZE IN BYTES (<=16KB) |
| 208 | 16 | DESCR HNDL | REORDER DESCRIPTOR HANDLE |
| 209 | 16 | FRAGMENT OFFSET | PACKET FRAGMENT OFFSET IN BYTES |
| 210 | 32 | BYTE SEQ NUM | BYTE SEQUENCE NUMBER |
| OR | | | |
| 211 | 16 | PKT SEQ NUM | PACKET SEQUENCE NUMBER |
| 212 | 16 | TOTAL SIZE | TOTAL PACKET SIZE |

RMAC TO PLE
RESPONSE
300

FIG. 3

| REF | SIZE | NAME | DESCRIPTION |
|---|---|---|---|
| 301 | 2 | RESPONSE TYPE | 0=TRANSFER PACKET<br>1=READ REORDER STATE |
| 302 | 1 | DESCRIPTOR HANDLE STATUS | 0=REORDER DESCRIPTOR HANDLE AVAILABLE<br>1=REORDER DESCRIPTOR HANDLE ALLOCATION FAILED |
| 303 | 1 | VECTOR HANDLE STATUS | 0=VECTOR HANDLE AVAILABLE<br>1=VECTOR HANDLE ALLOCATION FAILED |
| 304 | 1 | SEGMENT HANDLE STATUS | 0=BUFFER SEGMENT HANDLE AVAILABLE<br>1=BUFFER SEGMENT HANDLE ALLOCATION FAILED |
| 305 | 1 | NEXT EXPECTED MATCH | 0=LEFT EDGE SEQUENCE NUMBER MISS-MATCH<br>1=LEFT EDGE SEQUENCE NUMBER MATCH |
| 306 | 1 | SECTION STATUS | 0=BUFFER SEGMENT SECTION NOT COMPLETED<br>1=BUFFER SEGMENT SECTION COMPLETED |
| 307 | 1 | FRAGMENT STATUS | 0=FRAGMENTED PACKET INCOMPLETE<br>1=FRAGMENTED PACKET COMPLETE |
| 308 | 1 | RSC MISS | 0=RSC HIT<br>1=RSC MISS |
| 309 | 8 | TASK ID | PE TASK ID |
| 310 | 2 | REORDER TYPE | 00=NONE<br>01=WHOLE PACKET<br>10=FRAGMENTED PACKET<br>11=BYTE STREAM |
| 311 | 14 | RSC INDEX | REORDER STATE CACHE INDEX |
| 312 | 16 | DESCR HNDL | REORDER DESCRIPTOR HANDLE |
| 313 | 32 | SEQ NUMBER | SEQUENCE NUMBER |

PE TO RMAC REQUEST
400

FIG. 4

| REF | SIZE | NAME | DESCRIPTION |
|---|---|---|---|
| 401 | 8 | XFER SIZE | TRANSFER SIZE IN DW's |
| 402 | 8 | TASK ID | PE TASK ID |
| 403 | 2 | RSVD | RESERVED |
| 404 | 14 | RSC INDEX | REORDER STATE CACHE INDEX |
| 405 | 2 | OP | 00=READ<br>01=SET SACK FLAG<br>10=RESET REORDER STATE<br>11=RESERVED |
| 406 | 1 | READ SOURCE | 0=REORDER STATE<br>1=REORDER BUFFER |
| 409 | 8 | PE OFFSET | OFFSET IN PE IN DW's |
| 410 | 16 | DESCR HNDL | REORDER DESCRIPTOR HANDLE |
| 411 | 32 | SEQ NUMBER | SEQUENCE NUMBER |

RMAC TO PE RESPONSE
500

FIG. 5

| REF | SIZE | NAME | DESCRIPTION |
|---|---|---|---|
| 500 | 8 | TASK ID | IPE TASK ID |
| 501 | 1 | RSC MISS STATUS | 0=RSC HIT<br>1=RSC MISS |

| REF | SIZE | NAME | DESCRIPTION |
|---|---|---|---|
| 601 | 1 | OP | 00=READ REORDER BUFFER<br>01=BUFFER SEGMENT TRANSFER<br>10=ADVANCE REORDER STATE<br>11=TRANSFER AND ADVANCE |
| 602 | 6 | RSVD | RESERVED |
| 603 | 8 | TASK ID | PE TASK ID |
| 604 | 2 | REORDER TYPE | 00=NONE<br>01=WHOLE PACKET<br>10=FRAGMENTED PACKET<br>11=BYTE STREAM |
| 605 | 14 | RSC INDEX | REORDER STATE CACHE INDEX |
| 606 | 1 | RSVD | RESERVED |
| 607 | 15 | XFER SIZE | TRANSFER SIZE IN BYTES (<=16KB) |
| 608 | 16 | PAYLOAD OFFSET | THE OFFSET OF THE PACKET PAYLOAD IN BUFFER SEGMENT SECTION (FOR NON-BYTE STREAM SEGMENTS) IN BYTES |
| 609 | 16 | DESCR HNDL | REORDER DESCRIPTOR HANDLE |
| 610 | 32 | SEQ NUMBER | SEQUENCE NUMBER (OR RE-ORDER BUFFER BYTE ADDRESS) |

*FIG. 6*

600
DMAC TO RMAC REQUEST

| REF | SIZE | NAME | DESCRIPTION |
|---|---|---|---|
| 701 | 1 | OP | 0=READ<br>1=WRITE |
| 702 | 6 | XFER SIZE | TRANSFER SIZE IN DW's |
| 703 | 24 | ADDRESS | CONTROL MEMORY DW ADDRESS |

*FIG. 7*

700
RMAC TO CMAC REQUEST

FIG. 8

RMAC TO ARRAYS
INTERFACE REQUEST
800

| REF | SIZE | NAME | DESCRIPTION |
|---|---|---|---|
| 801 | 8 | TASK ID | PE TASK ID |
| 802 | 8 | XFER SIZE | TRANSFER SIZE IN DW's |
| 803 | 8 | OFFSET | PE OFFSET IN DW's |

FIG. 9

RMAC TO DTB
REQUEST
900

| REF | SIZE | NAME | DESCRIPTION |
|---|---|---|---|
| 901 | 8 | SLOT OFFSET | DTB SLOT OFFSET IN DW's |
| 902 | 8 | TASK ID | PE TASK ID |
| 903 | 4 | WRITE MASK | DW WRITE MASK |

FIG. 10

SSA ELEMENT
1000

| REF | SIZE | NAME | DESCRIPTION |
|---|---|---|---|
| 1001 | 1 | SACK FLAG | BUFFER SEGMENT SECTION ACK FLAG |
| 1002 | 14 | DATA COUNT | BUFFER SEGMENT SECTION DATA COUNT |

REORDER DESCRIPTOR FOR
BYTE STREAM REORDERING
1100

FIG. 11

| REF | SIZE | NAME | DESCRIPTION |
|---|---|---|---|
| 1101 | 32 | LSN | LEFT EDGE SEQUENCE NUMBER |
| 1102 | 32 | RSN | RIGHT EDGE SEQUENCE NUMBER |
| 1103 | 16 | SV HANDLE | BUFFER SEGMENT VECTOR HANDLE |
| 1104 | 16 | DESCR HANDLE | REORDER DESCRIPTOR HANDLE |
| 1105 | 1 | SEGMENT LEVELS | 0=ONE LEVEL OF SEGMENT VECTORS<br>1=TWO LEVELS OF SEGMENT VECTORS |
| 1106 | 7 | RSVD | RESERVED |
| 1107 | 8 | SSA COUNT | NUMBER OF COMPLETE SSA ELEMENTS |
| 1108 | 16 | LEFT EDGE BSH | LEFT EDGE BUFFER SEGMENT HANDLE |

BYTE SEQUENCE NUMBER MAPPINGS
FOR SINGLE LEVEL SEGMENTS
1200

FIG. 12

| REF | SEGMENT VECTOR INDEX | SSA INDEX | BUFFER SEGMENT INDEX |
|---|---|---|---|
| 1201 | SEQNUM[14:17] | SEQNUM[18:21] | SEQNUM[18:31] |
| 1202 | SEQNUM[13:16] | SEQNUM[17:20] | SEQNUM[17:31] |
| 1203 | SEQNUM[12:15] | SEQNUM[16:19] | SEQNUM[16:31] |
| 1204 | SEQNUM[11:14] | SEQNUM[15:18] | SEQNUM[15:31] |

BYTE SEQUENCE NUMBER MAPPINGS
FOR TWO LEVEL SEGMENTS
1400

FIG. 14

| REF | L1 SEGMENT VECTOR INDEX | L2 SEGMENT VECTOR INDEX | SSA INDEX | BUFFER SEGMENT INDEX |
|---|---|---|---|---|
| 1401 | SEQNUM[10:13] | SEQNUM[14:17] | SEQNUM[18:21] | SEQNUM[18:31] |
| 1402 | SEQNUM[9:12] | SEQNUM[13:16] | SEQNUM[17:20] | SEQNUM[17:31] |
| 1403 | SEQNUM[8:11] | SEQNUM[12:15] | SEQNUM[16:19] | SEQNUM[16:31] |
| 1404 | SEQNUM[7:10] | SEQNUM[11:14] | SEQNUM[15:18] | SEQNUM[15:31] |

FRAGMENTED PACKET
PSA ELEMENT
1600

FIG. 16

| REF | SIZE | NAME | DESCRIPTION |
|---|---|---|---|
| 1601 | 16 | TOTAL SIZE | TOTAL PACKET SIZE |
| 1602 | 16 | DATA COUNT | BYTES OF PACKET SO FAR RECEIVED |

| REF | SIZE | NAME | DESCRIPTION |
|---|---|---|---|
| 1701 | 16 | RSVD | RESERVED |
| 1702 | 16 | LSN | LEFT EDGE SEQUENCE NUMBER |
| 1703 | 16 | RSVD | RESERVED |
| 1704 | 16 | RSN | RIGHT EDGE SEQUENCE NUMBER |
| 1705 | 16 | SV HANDLE | BUFFER SEGMENT VECTOR HANDLE |
| 1706 | 16 | DESCR HANDLE | REORDER DESCRIPTOR HANDLE |
| 1707 | 1 | SEGMENT LEVELS | 0=ONE LEVEL OF SEGMENT VECTORS<br>1=TWO LEVELS OF SEGMENT VECTORS |
| 1708 | 7 | RSVD | RESERVED |
| 1709 | 8 | PSA COUNT | NUMBER OF COMPLETE PSA ELEMENTS |
| 1710 | 16 | LEFT EDGE BSH | LEFT EDGE BUFFER SEGMENT HANDLE |

1700
REORDER DESCRIPTOR FOR
PACKET REORDERING

*FIG. 17*

| PACKET TYPE | SEGMENT VECTOR INDEX | PSA INDEX |
|---|---|---|
| WHOLE | SEQNUM[8:11] | SEQNUM[12:15] |
| FRAGMENTED | SEQNUM[9:12] | SEQNUM[13:15] |

PACKET SEQUENCE
NUMBER MAPPINGS FOR
SINGLE LEVEL SEGMENTS

*FIG. 18*

| PACKET TYPE | L1 SEGMENT VECTOR INDEX | L2 SEGMENT VECTOR INDEX | PSA INDEX |
|---|---|---|---|
| WHOLE | SEQNUM[4:7] | SEQNUM[8:11] | SEQNUM[12:15] |
| FRAGMENTED | SEQNUM[5:8] | SEQNUM[9:12] | SEQNUM[13:15] |

PACKET SEQUENCE
NUMBER MAPPINGS FOR
TWO LEVEL SEGMENTS

*FIG. 21*

DATA REORDERING MECHANISM FOR HIGH PERFORMANCE NETWORKS

BACKGROUND OF THE INVENTION

1. Technical Field

The present invention generally relates to communication protocols between a host computer and an input/output (I/O) device. More specifically, the present invention provides a method by which data that has taken different paths through a network and, as a result arrives in a different order than which it was sent, can be efficiently reordered at the destination.

2. Description of Related Art

In an Internet Protocol (IP) Network, the software provides a message passing mechanism that can be used to communicate with Input/Output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through Upper Level Protocols, such as Sockets, iSCSI, and Direct Access File System (DAFS).

Unfortunately the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol. 4, No. 6, pp. 817–828, Dec. 1996; and D. D. Clark, V. Jacobson, J. Romkey, H. Salwen, "An analysis of TCP processing overhead", IEEE Communications Magazine, volume: 27, Issue: 6, June 1989, pp. 23–29). In the future the network stack will continue to consume excessive resources for several reasons, including: increased use of networking by applications; use of network security protocols; and the underlying fabric bandwidths are increasing at a higher rate than microprocessor and memory bandwidths. To address this problem the industry is offloading the network stack processing to an IP Suite Offload Engine (IPSOE).

There are two offload approaches being taken in the industry. The first approach uses the existing TCP/IP network stack, without adding any additional protocols. To remove the need for copies, the industry is pursuing two different approaches. One approach consists of adding Framing, Direct Data Placement (DDP), and Remote Direct Memory Access (RDMA) over the TCP and SCTP protocols. The IP Suite Offload Engine (IPSOE) required to support these two approaches is similar, the key difference being that in the second approach the hardware must support the additional protocols.

A second approach involves providing a significant amount of buffering on the network adapter, and having the hardware provide the copy of data received on the network as opposed to copying the data using software. At least for multi-threaded host applications, the hardware based copy operation can eliminate the overhead associated with the copy operation from the host CPU's. Even without multi-threading, the hardware can handle reordering issues before the CPU reaches the point where the copy operation would be performed, thereby streamlining the copying process. Beyond that, programming API's that support asynchronous communication can benefit from the copy off-load, even when there is no multi-threading.

For these reasons, and for backward compatibility, having a certain amount of buffering on the network adapter will be desirable for sometime to come. As more connection support DDP and RDMA, the amount of buffering required would presumably decrease. However, higher link bandwidths will offset this trend to some extent. Hence, the need for efficient buffering and reordering of inbound network traffic will remain relevant for a long time to come.

SUMMARY OF THE INVENTION

The present invention provides a mechanism for reordering data at a data destination in a higher performance network. The present invention provides dynamic, adaptive management of receive buffers in a host channel adapter while recovering on the fly the order of data sent over a medium that does not preserve order. The present invention operates for a number of important communication mediums, and without requiring searches of any type.

In an exemplary embodiment, the present invention includes a Reorder Memory Access Controller (RMAC) which is a unit that can be implemented for networks that do not support in-order delivery on a connection or virtual lane basis, or which have upper layer protocols that do not require pre-posted host receive buffers. The RMAC buffers incoming data and recovers the transmit order on the fly.

To buffer incoming data the RMAC supports a large reorder buffer, e.g., up to 4 Gigabytes (GB) of Double Data Rate (DDR) Synchronous Dynamic Random Access Memory (SDRAM). Although not strictly required, best performance is achieved if there is also a DDR/quad data rate (QDR) SRAM control store, where state information on buffers allocated to currently active connections is maintained.

RMAC interfaces include several request/response and data ports. A request/response port is provided for a Protocol Engine (PE), through which the PE accesses information required for protocol processing, and to issue RMAC state update commands. The actual transfer of protocol information occurs over another port to an Arrays Interface unit. A request/response port is provided for a Pre-Load Engine (PLE), which directs the RMAC where to place incoming data in the reorder buffer, and to issue RMAC state update commands. A port to the Control Memory Access Controller (CMAC) is provided for the RMAC to retrieve or update state information in control store needed to manage the reorder buffer. In addition, a port is provided for the Direct Memory Access Controller (DMAC) which is used by the DMAC to transfer data from the reorder buffer to host memory. Data coming from the network is staged on chip through a Data Transfer Buffer (DTB), and read from there by the RMAC on a dedicated port.

In an exemplary embodiment, the present invention provides a method and apparatus of reordering data of a data transmission received from a source device. The method and apparatus receives, in a data transfer buffer, a data packet transmitted over a connection associated with the source device and determines if the connection requires reordering of data packets. If the connection requires reordering of data packets, the data packet is transferred from the data transfer buffer to a reorder buffer and a reorder state cache is updated to reflect the transfer of the data packet to the reorder buffer. In response to receipt of a request to transfer data from the reorder buffer to the host memory, a next data packet sequence number is fetched from the reorder state cache and a position in the reorder buffer of the data associated with the next data packet sequence number entry is identified. The data is at this identified position is then transferred to the host memory.

These and other features of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram of a format of a PLE to RMAC request;

FIG. 3 is an exemplary diagram of a format of an RMAC to PLE response;

FIG. 4 is an exemplary diagram of a format of a PE to RMAC request;

FIG. 5 is an exemplary diagram of a format of an RMAC to PE response;

FIG. 6 is an exemplary diagram of a format of a DMAC to RMAC request;

FIG. 7 is an exemplary diagram of a format of an RMAC to CMAC request;

FIG. 8 is an exemplary diagram of a format of an RMAC to Arrays Interface request;

FIG. 9 is an exemplary diagram of a format of an RMAC to DTB request;

FIG. 10 is an exemplary diagram of a format of a Section State Array Element for byte stream reordering;

FIG. 11 is an exemplary diagram of a format of a Reorder Descriptor for byte stream reordering;

FIG. 12 is an exemplary diagram of a byte sequence number mapping for a single level of segment vectors for byte stream reordering;

FIG. 14 is an exemplary diagram of a byte sequence number mapping for two levels of segment vectors for byte stream reordering;

FIG. 16 is an exemplary diagram of a format of a Packet State Array Element for fragmented packet reordering;

FIG. 17 is an exemplary diagram of a format of a Reorder Descriptor for packet reordering;

FIG. 18 is an exemplary diagram of a packet sequence number mapping for a single level of segment vectors for packet reordering;

FIG. 21 is an exemplary diagram of a packet sequence number mapping for two levels of segment vectors for packet reordering;

DETAILED DESCRIPTION OF THE PREFERRED EMBODIMENT

A host channel adapter (HCA) is a device that attaches a computing platform to a switching network. The platform may have a wide range of characteristics and is referred to as a node in a collection of platforms that communicate through the switching network. Communication performed by the HCA is essentially an asynchronous data transfer from a set of send buffers in a process running on one node to a set of receive buffers in a process running on another (or even the same) node.

Logically, communication between the two communicating processes is said to occur over a channel, sometimes also referred to as a connection. To establish a channel or connection, a channel end point on one node is logically bound to a channel end point on another node by some set of hardware and software system management facilities. Many thousands of channels may be supported by a single HCA, where there may only one or two physical network ports.

Many network mediums do not deliver data in the order it is sent. If the end user API requires ordered delivery, but the network doesn't maintain order, the destination must recover the order of transmitted data. This is a very common situation (e.g. Sockets over TCP/IP). The novel aspect of this invention is that it provides dynamic (adaptive) management of receive buffers in a host channel adapter while recovering (on the fly) the order of data sent over a medium that does not preserver order. It does so for a number of important communication mediums, without requiring searches.

Figure 1A:
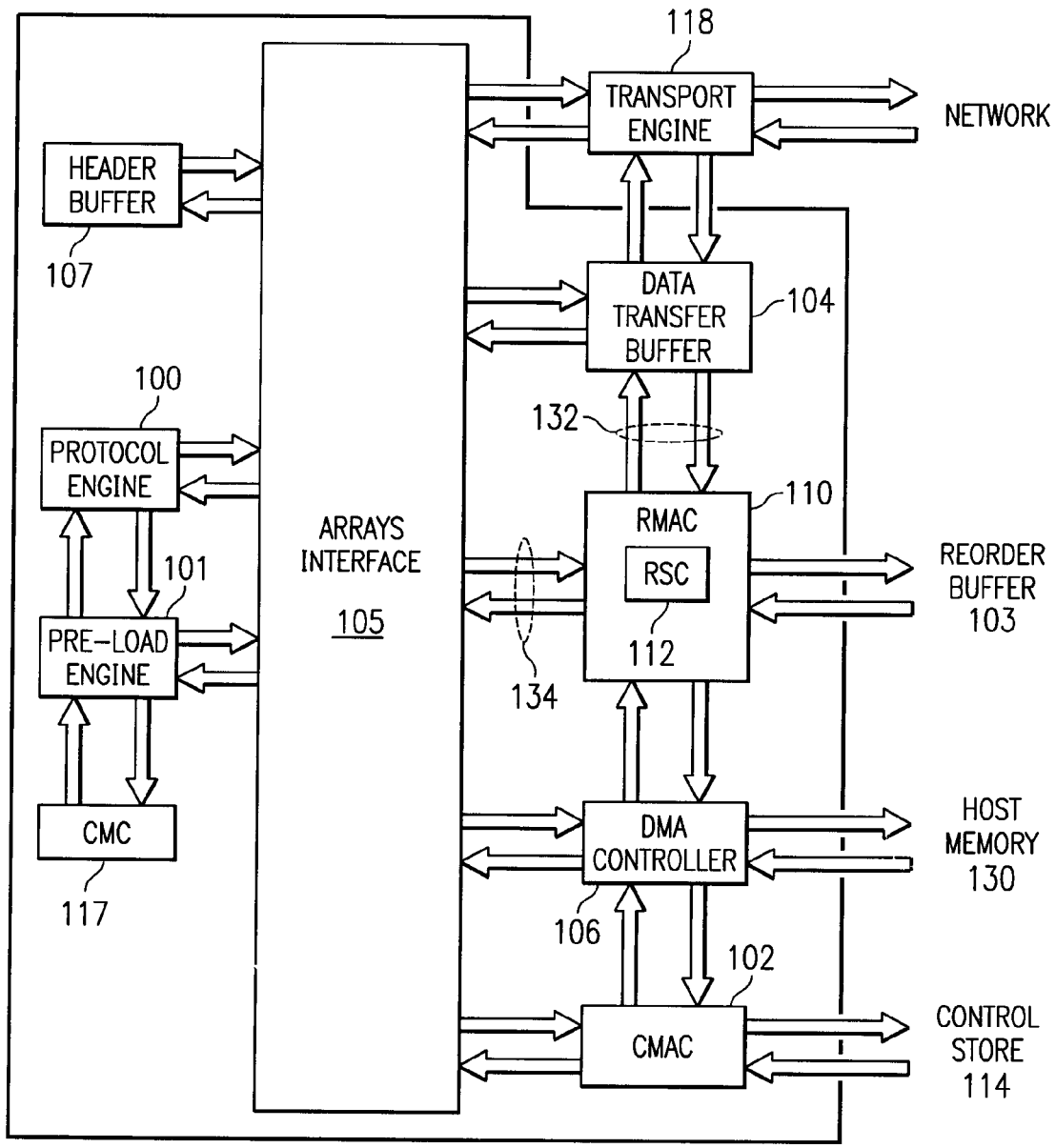
FIG. 1A is an exemplary top level diagram of a device in which the present invention may be implemented.

FIG. 1A is an exemplary top level diagram of an HCA in which the present invention may be implemented. The Protocol Engine (PE) 100 is the primary control unit of the HCA. Possible implementations range from hardwired logic to general purpose processor. Activity on the PE is initiated by signals from a process running on the host (typically in the form of memory mapped I/O (MMIO)), or by packets arriving from the network. The host process signals the PE to indicate that is has work for the HCA to perform. Often times this work may be specified in data structure the process created in host memory on a per channel basis. The signal tells the HCA that such information has been created and that it should fetch, parse, and act upon the information. An action might be to fetch data from a specified memory buffer and to send it out in packets on a specified channel, or to abort a pending channel transfer. The PE is the master agent of the HCA, and as such directs the other HCA units in order to perform the tasks the HCA is capable of.

The Pre-Load Engine (PLE) 101 is an agent which performs certain critical pre-processing steps on packets coming from the network, before signaling the PE that the packet has arrived. Before the PE can act upon a received packet, it must have access to information about the channel on which the packet arrived. This information would include channel parameters such as the location in host memory of the process specified directives where the incoming data is to be placed, interrupt specifications, handles of threads to be notified, or whether the channel is part of a multi-cast group. It would also include channel state such as the current position in the receive buffer where last packet received was deposited, how much room is left in the receive buffer, the last sequence number of the byte or packet received, if an interrupt has already been issued but not yet acknowledged, etc. When a packet arrives the PLE checks to see if needed channel parameters and state are cached in the PE. If they are not, it fetches them from control store 114 (along with the packet header) into PE designated locations. The control store is the primary repository of channel parameters and state.

Another function of the PLE is mapping the channel or connection ID from the name space of the network to the name space of the HCA. For example in TCP/IP a connection (i.e. channel) end point is identified by its TCP/IP 5-tuple (i.e. source IP address and port, destination IP address and port, and protocol type). The PLE would map a TCP/IP 5-tuple into a compact index which can be used to perform a lookup in control store of the connection context. This mapping would typically be done using a hashing algorithm, but the PLE would likely store the mappings for the most recently used connections in a channel mapping cache (CMC) 117. A CMC may be implemented as a content addressable memory (CAM), a set associative cache, or as an actual hash table. In any case, its purpose is to expedite mapping from the channel name space of the network to the channel name space of the HCA.

The Transport Engine (TE) 118 handles the link level protocol for transmission and reception of the network packets. It handles link level flow control, detection of errors, and packet re-transmit. To transmit a packet, the PE notifies the TE that a packet header and payload are waiting to be transmitted and where in the Header Buffer (HDB) 107 and Data Transfer Buffer (DTB) 104 the header and payload can be found.

The HDB 107 and DTB 104 are simple staging buffers. The PE builds the header in the HDB and instructs the DMA Controller 106 where to build the payload in the DTB (for a packet to be transmitted, before instructing the TE to transmit the packet). The TE deposits headers into the HDB and payloads into the DTB of packets received from the network, and notifies the PLE when it has done so.

All access to control store 114 goes through the Control Memory Access Controller (CMAC) 102. The CMAC fields requests from the PE, PLE and RMAC for access to control store. Control store would typically be a large off chip SRAM. The CMAC implements the interface to that memory and schedules access requests and responses.

All access to host memory 130 goes through the Direct Memory Access Controller (DMAC) 106. The DMAC fields requests from the PE to transfer packet payloads between the DTB 104 and data buffers in host memory. The PE also issues requests to the DMAC to fetch directives created by host processes in host memory, or to write status in pre-defined locations in host memory on the state of currently active channels. The DMAC can also transfer data from the Reorder buffer 103 (that was transferred from the DTB) to host memory as directed by the PE.

The Arrays Interface 105 supports transfers between the on chip staging buffer (HDB, DTB), host memory, or control store, and the internal storage areas of the PE and PLE. It provides essential routing and flow control for such transfers.

Figure 1B:
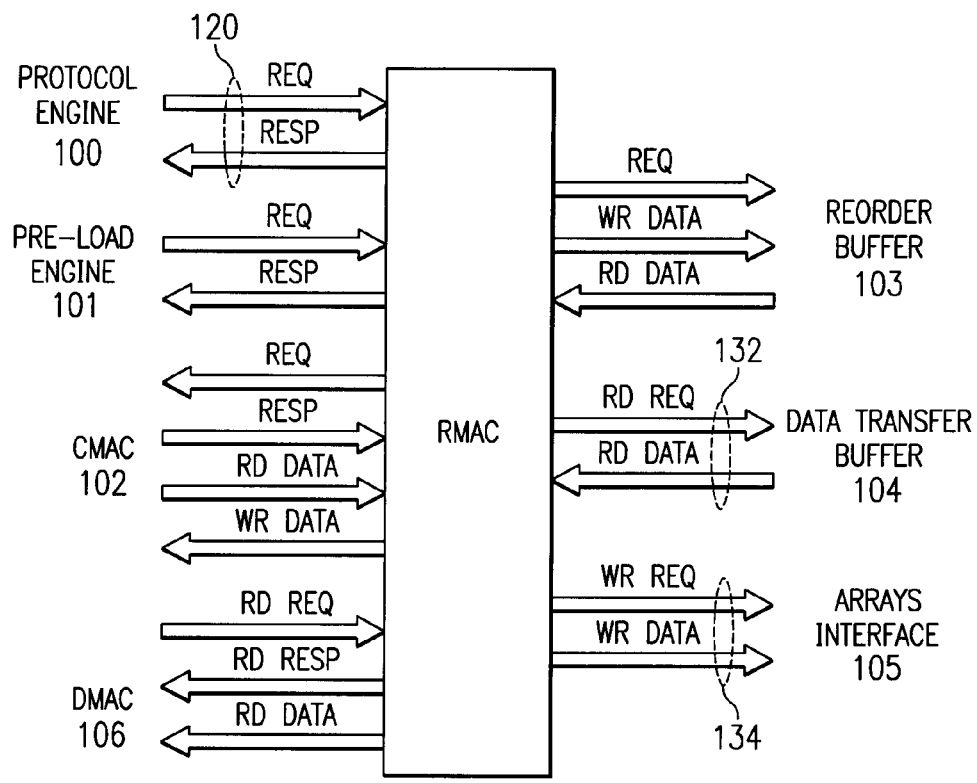
FIG. 1B is an exemplary top level interface diagram of a RMAC according to the present invention.

FIG. 1B is a top level interface diagram of a Reorder Memory Access Controller (RMAC) 110 according to an exemplary embodiment of the present invention. RMAC interfaces include several request/response and data ports. The RMAC 110 includes a request/response port 120 for a Protocol Engine (PE) 100, through which the PE 100 accesses information required for protocol processing, and to issue RMAC state update commands. The actual transfer of channel parameters and state occurs over another port 134 to an Arrays Interface unit 105.

The RMAC 110 also includes a request/response port for a Pre-Load Engine (PLE) 101, which directs the RMAC 110 where to place incoming data in the reorder buffer 103, and to issue RMAC state update commands. The RMAC 110 further includes a port to the Control Memory Access Controller (CMAC) 102, which is used by the RMAC 110 to retrieve or update state information in control store 114 needed to manage the reorder buffer.

Moreover, the RMAC 110 also includes a port for the Direct Memory Access Controller (DMAC) 106 which is used by the DMAC 106 to transfer data from the reorder buffer 103 to host memory 130. Data coming from the network is staged on chip through a Data Transfer Buffer (DTB) 104, and read from the DTB 104 by the RMAC 110 on a dedicated port 132. Reordering in the RMAC 110 can be done on a byte stream basis, a packet basis, a fragmented packet basis, or not at all, as illustrated in FIGS. 4 through 9, described hereafter.

As packets arrive from the network the Pre-Load Engine (PLE) 101 issues requests to the RMAC 110 which passes information from the packet headers needed to reorder the packets. The RMAC 110 caches reorder state (e.g. sequence numbers, host buffer locations, the amount of data buffered, etc.) for a subset of channels in a Reorder State Cache (RSC) 112. If the information the RMAC 110 needs is not locally cached in the RSC 112, the RMAC 110 issues a request to the CMAC 102 to fetch it from control store 114. Reorder state is generated by the RMAC, initially in the RSC and then back stored in control store. Only a subset of the reorder state in the control store 114 will be cached in the on-chip RSC 112 at any given time.

Figure 1C:
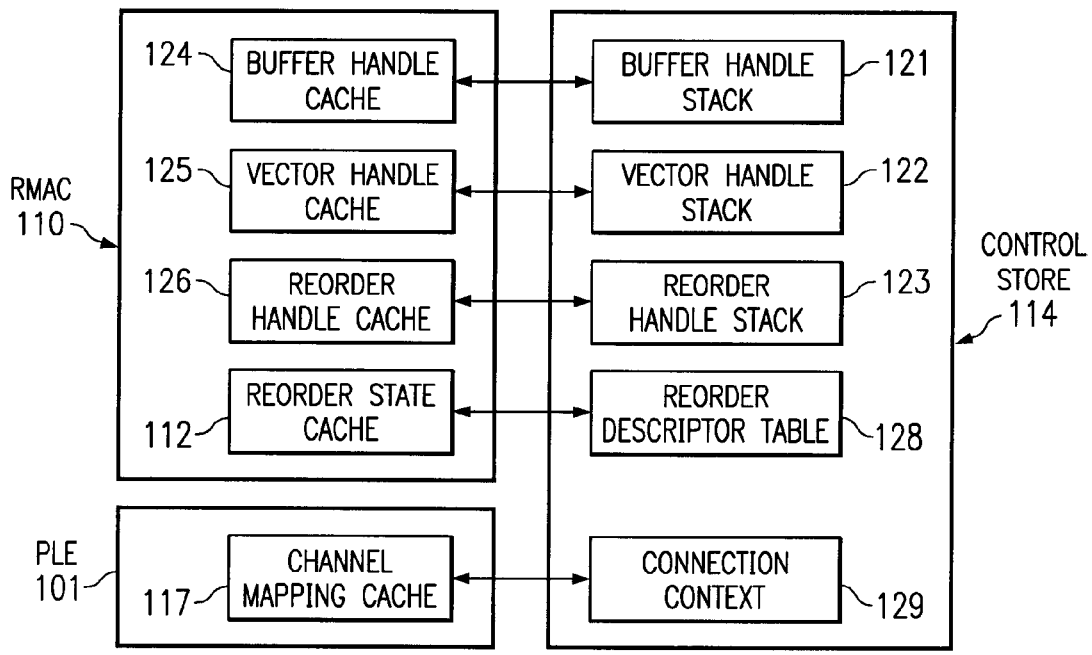
FIG. 1C shows an exemplary embodiment of the data structures maintained by the RMAC and PLE in the control store, and the corresponding caches in the RMAC and PLE.

FIG. 1C illustrates an exemplary embodiment of the data structures maintained by the RMAC 110 and PLE 101 in the control store 114, and the corresponding caches in the RMAC 110 and PLE 101. These structures are referenced and described throughout the remainder of the disclosure.

As data is received by the HCA from the network, the RMAC 110 either stores connection information, such as what data has been received and acknowledged so far across a particular connection, in the RSC 112 or obtains this information from the control store 114 via the CMAC 102. Once the RMAC 110 has the information it needs, the RMAC 110 issues a request to the DTB 104 to fetch the packet (or just its payload) and writes it out to the reorder buffer 103.

The Protocol Engine (PE) 100 issues to the RMAC 110 to read information it requires from the reorder buffer 103, in response to a notification from the PLE that a packet has arrived on the network. This is passed to the PE 100 through the Arrays Interface 105. The PE 100 also issues requests to the DMAC 106 to transfer data from the reorder buffer 103 to host memory 130, when the protocol engine determines it is appropriate to do so (on the basis of the communication protocol it is implementing). The DMAC 106 processes these requests and fetches the requested data through the RMAC 110.

The protocol engine is assumed but not defined by the RMAC 110. There are any number of policies that may be implemented by the PE 100 for when to transfer data from the reorder buffer 103 to host memory 130. The RMAC 110 reorders the data, supplies the PE 100 with indications of what data has so far been received, and lets the PE 100 decide what to do with the data based on the policies implemented by the PE 100. The RMAC 110 also provides a well defined interface over which the PE 100 invokes transfers from the reorder buffer 103 to the host memory 130.

To perform its task, the RMAC 110 manages a set of dynamically allocated structures that maintain the state of all the reorder buffer 103 space currently allocated on a per channel. The primary location of these structures is the control store 114, however at any given moment a subset may be cached in the RSC 112.

In a preferred implementation described here, the RSC 112 and the Connection Mapping Content Addressable Memory (CMC) 117 in the PLE 101 have the same number of entries. In a preferred embodiment the CMC 117 is a Content Addressable Memory (CAM) used to map a TCP/IP 5-tuple to a 32 bit connection id and/or a 32 bit connection id to an RSC index and the control store address where the corresponding connection context 129, i.e. current status of the connection, is stored or cached. As such, the RSC 112 is an extension of the CMC 117 and a hit in the CMC 117 implicitly indicates a hit in the RSC 112. The connection context used by the PLE 101 and PE 100 is maintained in one part of control store, the reorder information for the RMAC 110 is maintained in a different part of control store.

The RMAC 110 performs the actual transfers between the RSC 112 and the control store 114, but the PLE 101 specifies which RSC 112 entries are to be modified and when to modify them. When a packet arrives at the transport engine 118, the PLE 101 is notified and it performs a lookup in the CMC 117 of the data packet sequence number to determine if the data packet received is the next expected data packet. If the data packet contains an indication that it was transmitted on a connection that requires reordering and if there was a CMC hit, the PLE 101 issues a Packet Transfer Request to the RMAC 110, passing the encoded hit vector. A hit vector is a one by N bit vector that, when encoded, produces an index that indicates the position of the '1' in the bit vector. Since the RSC 112 is a shadow of the CMC 117, the encoded hit vector is an index both into the RSC 112 and the CMC 117 in the request.

The RMAC 110 uses the encoded hit vector as the RSC 112 lookup index. Using the information from the RSC 112, the RMAC 110 can transfer the data packet (or its payload) from the DTB 104 to the reorder buffer 103. If the sequence number in the data packet that the PLE 101 is currently handling is the one next expected, the PLE 101 will pre-load the context of the connection the packet arrived on into the PE 100 if it is not already there. The next expected sequence number is supplied to the PLE 101 from the RSC 112 by the RMAC 110 in the response to the packet transfer request.

Note that if the control store 114 is not large enough to hold all connection contexts 129, then part of the control store 114 is configured as a connection context cache. In this case the PLE 101 derives a host memory address for the connection context from the connection id.

The same set of reorder state structures are used by the RMAC 110 for all types of reordering. However, the contents are interpreted differently for each type of reordering, as illustrated in FIGS. 13, 15, 19, 20, 22 and 23, and described hereafter. For example, one structure the RMAC 110 uses is called a Reorder Descriptor (1320, 1520, 1920, 2020, 2220 and 2320). A reorder descriptor contains part of the state needed to maintain the reorder buffer space allocated to a connection. It is identified by a 16 bit Reorder Descriptor Handle (1300, 1500, 1900, 2000, 2200 and 2300). There is space for two reorder descriptor handles in every connection context 129 (one for normal and one for fragmented packets), and for the next expected sequence number on that connection. All other information required by the RMAC 110 is maintained in dynamically allocated control store 114 based structures.

When there is a CMC miss, the PLE 101 issues an RSC Eviction Request (see FIG. 2) to the RMAC 110 to write back the corresponding RSC 112 entry to control store 114. The PLE 101 then goes about trying to fetch a reorder descriptor handle and next expected sequence number from the new connection context 129 in the control store 114. If the incoming packet contained a connection id, the PLE 101 can immediately issue the fetch request to the DMAC 106 for that connection context.

However, if the incoming packet is legacy TCP/IP, the PLE 101 first signals the PE 100 that it needs to translate a TCP/IP 5-tuple into a connection id. When the PE 100 responds with the connection id, the PLE 101 can then issue the DMAC request to fetch the connection context.

When the RMAC 110 receives the eviction request, it writes back the evicted RSC 112 entry to the control store 114 and passes the descriptor handle and next expected sequence number for that entry to the PLE 101 in the response. The PLE 101 then issues a request to the DMAC 106 to write the descriptor handle and next expected sequence number out to the corresponding connection context 129 in control store. When the PLE 101 receives the part of the connection context that contains the descriptor handle and next expected sequence number, the PLE 101 issues a packet transfer request to the RMAC 110.

The RMAC 110, seeing that an RSC 112 miss has occurred, updates the RSC 112 entry indicated by the reorder descriptor handle in the request and then processes the packet transfer request. The update occurs as follows. If the descriptor handle that was fetched from the connection context was NULL (i.e. 0x0000), the RMAC 110 allocates a new one from a Reorder Descriptor Handle Stack (RHS) 123, and records it in the RSC 112 along with the next expected sequence number from the packet transfer request. The PLE 101 stalls processing on any subsequent packet that arrives on the same connection until after the CMC 117 miss is processed. Note that when there is a CMC miss, the PLE 101 forwards the connection context 129 it fetched to the PE 100, rather than directing the DMAC 106 to do so directly. The RSC 110 may alternatively be implemented as an independent cache with a different number of entries than the CMC 117.

The entire reorder buffer 103 memory is viewed by the RMAC 110 as a heap of fixed size Buffer Segments (1315, 1515, 1915, 2015, 2215 and 2315). The size of the segments is software configurable to different sizes, such as 16 KB, 32 KB, 64 KB, or 128 KB. Buffer segments are identified by their Buffer Segment Handle (1312, 1512, 1912, 2012, 2212 and 2312). The maximum amount of reorder buffer space is thus a function of the segment size, up to, for example, 4 GB (i.e. 1 GB, 2 GB, 3 GB or 4 GB).

Reorder buffer 103 space is dynamically allocated to connection end points on a demand basis as the PLE 101 issues packet transfer requests to the RMAC 110. An allocation occurs when the RMAC 110 reads a segment handle from the Buffer Segment Handle Stack (BHS) 121. The BHS 121 is a first-in-last-out (FILO) stack in the control store 114 that is initialized with all supported segment handles.

Each reorder descriptor points to a Buffer Segment Vector, or segment vector for short (1313, 1513, 1913, 2013, 2213 and 2313). Segment vectors are control store 114 based structures that, like reorder descriptors, are dynamically allocated. In a preferred embodiment, the segment vectors contain 16 elements, each of which is 16 bits. Segment vectors are identified by their 16 bit Segment Vector Handle (1307, 1507, 1907, 2007, 2207 and 2307). Segment vector allocation occurs when the RMAC 110 reads a vector handle from the Vector Handle Stack (VHS) 122. The VHS 122 is a FILO stack located in control store 114 that is initialized with all vector handles supported by the RMAC 110.

A reorder descriptor always points to one segment vector. However, two levels of segment vectors can be attached to a reorder descriptor. While the amount of data buffered on a connection is less than or equal to that which can be held in 16 buffer segments, there is only one level (i.e. one segment vector), which contains up to 16 segment handles. However, when the amount of buffered data exceeds the capacity of 16 buffer segments, two levels are introduced. This is accomplished by demoting the first level segment vector (1513, 2213, 2313) to a second level (1516, 2216, 2316) and allocating a new segment vector to the first level. The first level vector is then a 16 element vector of pointers to (up to 16) second level vectors.

Each buffer segment is managed as a set of equal sized Segment Sections (for byte stream reordering) or Packet Slots (for packet reordering), the state of which is maintained in a Section State Array (SSA) (1314, 1514) or a Packet State Array (PSA) (1914, 2014, 2214, 2314), respectively. An SSA or PSA is a 32 byte control store based structure that is statically bound to a buffer segment. Hence, when a buffer segment is allocated an SSA or PSA is implicitly allocated with it. Thus a buffer segment handle identifies the location of both the buffer segment in the reorder buffer 103, and the SSA or PSA in control store 114. Segment sections or Packet Slots are loaded in any random order. However, the data in a segment is consumed strictly from left to right.

To limit the amount of control store 114 accesses required for allocation and de-allocation of reorder control structures, there are 256 entry caches for all three handle stacks (RHS, BHS, VHS) in the RMAC 110. These are referred to as the: Reorder Descriptor Handle Cache (RHC) 126, the Vector Handle Cache (VHC) 125, and Buffer Segment Handle Cache (BHC) 124. The caches are all initialized with the top 256 entries of the corresponding handle stack, and are managed by the RMAC 110 so as to always contain some of the entries near the top of the stack. When the RMAC 110 accesses a stack, it is actually accessing the corresponding cache. When the RMAC 110 reads the last entry in the cache, the next 128 entries of the stack are automatically fetched from control store 114 into the bottom half of the cache and the cache top pointer is adjusted to point to the middle of the cache.

If when the RMAC 110 writes to the stack (to restore a segment handle to the stack) the cache becomes full, the bottom 128 entries of the cache are pushed out to the control store 114, the top 128 entries of the cache are shifted down (simultaneously) to the bottom of the cache, and the cache top pointer is adjusted to point to the middle of the cache. If the RMAC attempts to access the stack during a re-load or write-back operation, the access is stalled until the operation completes.

Typically only a subset of connections will have reorder buffer space allocated to them. If, when the RMAC 110 receives a request from the PLE 101 to buffer an incoming packet, the RMAC 110 finds any stack that it needs a handle from to be empty, a response is returned to the PLE 101 indicating the condition. The PLE 101 may or may not drop the incoming packet as a result.

PLE to RMAC Interface

The format of a PLE to RMAC request 200 is shown in FIG. 2. A Packet Transfer request specifies the offset of the packet payload in the DTB slot 202 (for byte stream reordering), the id of the task that issued the request 203, the type of reordering to be performed 204, the index into the RSC where cached reorder state may be found 205, an RSC hit/miss indication 206, the size of the packet or packet payload to be transferred 207, a reorder descriptor handle 208, a packet fragment offset 209 (for fragmented packets), and a packet or byte sequence number (210 or 211). The total packet size is also specified for a whole packet 212, or for the first fragment of a fragmented packet. In the case of an RSC hit, no reorder descriptor handle is passed in the request.

If the PLE 101 had detected a miss, it first issues an RSC Eviction Request 201 to the RMAC 110. An eviction request specifies the id of the task that issued the request 203, and the index of the RSC 112 entry to be evicted 205. None of the other parameters are used by the RMAC 110 for this request. The RSC 112 entry contains the descriptor handle that specifies the control store 114 write-back location (1310, 1510, 1910, 2010, 2210 and 2310). If that handle is NULL, the eviction request is ignored. If the descriptor handle in the subsequent packet transfer packet request 208 is NULL, the PLE 101 issues a Set Next Expected Sequence Number request immediately after the transfer request 201, to initialize the new RSC 112 entry with the next expected sequence number. No response is issued to the PLE 101 for either request type.

After receiving a response to a packet transfer request, the PLE 101 may issue a Read Reorder State request to pre-load the reorder state of the associated connection into the PE 201. This request specifies a thread id 203, an RSC index 205, transfer size 207, and a reorder descriptor handle 208. The RMAC 110 transfers the specified reorder descriptor and left most SSA (1314, 1514) or PSA (1914, 2014, 2214, 2314) to which it points, to the PE 100 over the Arrays Interface 105 (up to the amount indicated in the transfer size). If the descriptor handle in the RSC entry (1310, 1510, 1910, 2010, 2210, 2310) matches the one in the request, then the reorder descriptor from the RSC 112 is transferred. Otherwise, the reorder descriptor is fetched from the Reorder Descriptor Table 128 in control store 114.

The location in the PE 100 where the reorder state is to be written would typically be specified in a configuration register. It is also typically a function of a thread id 801 (for a multi-threaded PE) supplied to the RMAC 110 in the read reorder request. The RMAC 110 passes both the thread id and the target location in the PE 803 to the PE 100 in the Arrays Interface request 800. The PE 100 uses this information to determine where to place the reorder descriptor and SSA or PSA record inside the PE 100.

The format of a RMAC to PLE response 300 is shown in FIG. 3. Only packet transfers and read reorder state requests generate responses, as indicated in the first bit of the response 301. While processing a transfer request, the RMAC 110 may need to allocate a descriptor, and a vector or segment handle. If the attempt to do so fails, an indication is returned in the corresponding Handle Status bit of the response (302, 303, 304). If the sequence number in the request is the next expected on the corresponding connection (1305, 1505, 1905, 2005, 2205 and 2305), the response will indicate such in the Next Expected Match flag 305. If the buffer segment section into which the packet payload is being transferred is completed by the transfer the response will indicate such in the Section Status flag 306 (for byte stream reordering).

Normally the Sequence Number returned in the response 313 is the same as the one received in the request (210, 211). However, when section status indicates that a section has been completed 307, the sequence number 313 reflects the head of the corresponding section instead. If the data being transferred was a packet fragment, the response will indicate when all the packet fragments have been received in the Fragment Status flag 307 of the response.

The Reorder Type 310, RSC Index 311, and RSC Miss response 308 fields are simply copied from the request. The Reorder Descriptor Handle 312 is also copied from the request, except when a packet transfer request indicates that there has been an RSC miss and the descriptor handle in the request is NULL. For this case, the RMAC 110 allocates a new handle from the RHS 123 and returns it in the response. Responses to reorder state read requests only specify the response type and thread id.

PE to RMAC Interface

The format of a PE to RMAC request 400 is shown in FIG. 4. A Read Reorder Buffer request is issued by the PE 100 to fetch a protocol data unit (PDU) from the reorder buffer 103. A PSU is the basic unit of protocol processing managed by the PE. The Read Reorder Buffer request specifies the id of the task that issued the request 402, the index into the RSC 112 where cached reorder state information may be found 404, the size of the PDU header to be fetched 401, the handle of the reorder descriptor to be used in processing the request 410, the location in the local storage of the PE where the PDU is to be deposited 409, and the packet or byte sequence number where the PDU is located in the reorder buffer 411.

The RMAC 110 validates the RSC entry by comparing the descriptor handle from the request 410 with the one stored in the RSC entry (1310, 1510, 1910, 2010, 2210 and 2310). If they match, the RMAC 110 uses the information in the RSC entry to process the request. If they do not match, then the RMAC 110 must fetch the reorder descriptor from the control store 114 using the descriptor handle provided in the request. In either case, the reorder descriptor provides the RMAC 110 with the information it needs to navigate down to the buffer segment (1315, 1515, 1915, 2015, 2215 and 2315) that the sequence number in the request references. Once the RMAC 110 has resolved the actual reorder buffer address where the PDU is located, the RMAC 110 transfers the amount specified in the request to the PE 100 through the Arrays Interface 105. The RMAC 110 passes the PE 100 target, the thread id, and the register file offset from the read reorder request back to the PE 100 in the Arrays Interface request. The PE 100 uses these to determine where to place the PDU being passed to it by the RMAC 110 over the data port 134 of the Arrays Interface.

A Read Reorder State request specifies a thread id, an RSC index, transfer size, a reorder descriptor handle, and the offset in the PE 100 where the RSC entry is to be deposited.

The RMAC 110 transfers the specified reorder descriptor and left most SSA (1314, 1514) or PSA (1914, 2014, 2214 and 2314) to which it points, to the PE 100 over the Arrays Interface 105 (up to the amount indicated in the transfer size).

If the descriptor handle in the RSC 112 entry matches the one in the request, then the reorder descriptor from the RSC 112 is transferred. Otherwise, the RMAC 110 fetches the reorder descriptor from the control store 114. The RMAC 110 passes the thread id, and offset from the read reorder request back to the PE 100 in the Arrays Interface request. The PE 100 uses these to determine where to place the RSC 112 entry being passed to it by the RMAC 110 over the data port 134 of the Arrays Interface 105.

Among commonly implemented features of TCP/IP and other protocols is a Selective Acknowledgment (SACK) option. Without the SACK option, TCP/IP waits until it receives a packet containing the next expected sequence number before issuing an acknowledgment (ACK). When this packet is received the next expected sequence number is advanced to the next consecutive byte location in the sliding window where data has not yet been received. The sequence number of this location is passed back to the sender in an ACK.

With selective acknowledgment, the receiver doesn't wait for the packet containing the next expected sequence number before issuing an acknowledgment to the sender. Instead it issues a SACK which indicates the starting and ending sequence number of a contiguous group of packets it received. The RMAC 110 provides support for implementing the SACK option in the form of a SACK Flag 1001 in each SSA element. The PE 100 can set this flag to remember which buffer segment sections it had already issued a SACK against (should it choose to do so). A Set SACK Flag request 405 specifies an RSC index 404, a reorder descriptor handle 410, and the sequence number of the buffer segment section who's SACK flag is to be set 411. The RMAC 110 uses the information in the request to navigate down to the SSA 1000 or PSA 1600 element corresponding to the buffer segment section, and to set the SACK Flag 1001 in that element (performing a read-modify-write).

If a connection fails or a user indicates that it wishes to tear down a connection, the PE 100 needs a means for releasing and resetting the reorder state associated with the connection. A Reset Reorder State request 405 is provide for this purpose. A Reset Reorder Request specifies an RSC index 404 and descriptor handle 410. When the RMAC 110 receives this request it de-allocates all the reorder state structures attached to the specified reorder descriptor and then clears the RSC entry.

The format of an RMAC to PE response 500 is shown in FIG. 5. A response indicates whether there was a hit or miss in the RSC (for read ops) 501, and the id of the task that issued the request 500. Responses are issued by the RMAC 110 to notify the PE 100 of a request completion.

DMAC to RMAC Interface

The format of a DMAC to RMAC request 600 is shown in FIG. 6. The RMAC 110 supports two types of transfers via the DMAC 106. Both are transfers from the reorder buffer 103 to host memory 130. A Read Reorder Buffer request accesses the reorder buffer as a memory with a flat address space. This type of request specifies a thread id 603, a transfer size 607, and a byte address 610 (in the Sequence Number field). For simplicity Transfers are restricted to multiples of 16 bytes. Hence, the low four bits of the transfer size and reorder buffer address are assumed to be zero.

A Buffer Segment Transfer request specifies the offset of the packet payload in the buffer segment section (for non-byte stream reordering) 608, the id of the task that issued the request 603, the type of reordering associated with this buffer segment 604, an index into the RSC 112 where cached reorder state may be found 605, the size of the transfer in bytes 607, the handle of the reorder descriptor to be used in processing the request 609, and packet or byte sequence number 610.

The RMAC 110 validates the RSC 112 entry by comparing the descriptor handle from the request with the one stored in the RSC 112 entry. If they match, the RMAC 110 uses the information in the RSC 112 entry to process the request. If they do not match, then the RMAC 110 must fetch the reorder descriptor from the control store 114 using the descriptor handle provided in the request. In either case, the reorder descriptor provides the RMAC 110 with the information it needs to navigate down to the buffer segment that the sequence number in the request references. Once the RMAC 110 has resolved the actual reorder buffer address where the data is located, it transfers the amount specified in the request to the DMAC 106.

Transfer and Advance 601 is the counter-part to the PLE to RMAC Packet Transfer request 200. The latter causes reorder state updates as data is transferred from the DTB 104 to the Reorder buffer 103, and the former causes a different type of reorder state update as data is transferred from the reorder buffer to host memory. The type of update is a function of the type of reordering being done, as described in later sections.

Advance Reorder State 601 is identical to a Transfer and Advance, except no data is actually transferred. Responses to DMAC to RMAC requests only specify the thread id from the request.

RMAC to CMAC Interface

The RMAC 110 retrieves and updates the control store 114 based reorder state information through a port 126 on the CMAC 102 provided for this purpose. For simplicity transfers are restricted to multiples of 8 bytes aligned on 8 byte boundaries.

The format of a RMAC to CMAC requests 700 is shown in FIG. 7. As shown in FIG. 7, a Read request 701 transfers the specified number of double words (DW=eight bytes) from the specified DW address in the control store 114 through the CMAC 102 to the RMAC 110. A Write request 701 transfers the specified number of DW's 702 from the RMAC 110 to the specified DW address 703 in the control store 114 through the CMAC 102. Requests and data are processed in strict FIFO order. There is no independent response port.

There is an 8 byte wide×64 byte deep associative posted write queue on the CMAC write port 126. The RMAC 110 uses this queue for sub-eight byte writes to the control store 114, which require a read-modify write (because of an 8 byte Error Correction Circuit (ECC)).

When a sub-eight byte write is needed, the RMAC 110 first reads the DW word(s) in which the write is to occur into the posted write queue (if they aren't already there), merges the modified fields with that read from the control store 114, and leaves the result in the posted write queue. Least recently referenced queue entries are evicted to the control store when there is a capacity miss on the write queue.

RMAC to Arrays Interface

The RMAC 110 issues requests to the Arrays Interface 105 in response to requests, e.g., requests 200 and 400, from the PE 100 and PLE 101 to transfer information between the reorder buffer 103 (or reorder state) and PE 100. Likewise, the actual data transfer occurs on the Arrays Interface port 134.

There are independent read request, read data, write request, and write data ports between the RMAC 110 and the Arrays Interface 105. Request and data transfers are fully pipelined and are processed in strict FIFO order.

The format of a RMAC to Arrays Interface requests is shown in FIG. 8. As shown in FIG. 8, the RMAC 110 passes the thread id 801, the transfer size 802, and a PE offset 803 in the Arrays Interface request 800. The RMAC uses this interface to transfer information requested by the PEE from the reorder buffer or RMAC itself to the PE.

RMAC to DTB Interface

The RMAC 110 issues requests to the Data Transfer Buffer (DTB) in response to requests, e.g., requests 200 and 400, from the PE 100 and PLE 101 to transfer information between the DTB 104 and the RMAC reorder buffer 103. The format of a RMAC to DTB requests is shown in FIG. 9.

As shown in FIG. 9, the RMAC 110 passes the thread id 902, the offset in the DTB slot where the transfer is to start 901, and in the case of write operations, a four bit write mask 903. There are independent read request, read data, write request, and write data ports between the RMAC 110 and the DTB 104.

The RMAC 110 pipelines a sequence of read requests into the read request port. For each request, the DTB 104 pipelines back read data. The RMAC 110 pipelines a sequence of write requests into the write request port. For each request, it also pipelines in write data, and the four bit DW mask 903 that indicates which DW's on the write data bus are to be stored in the DTB 104. A '1' specifies the corresponding DW should be written. A '0' specifies that it should not be written.

Byte Stream Reordering

For byte stream oriented connections (described in this paragraph and the next), the RMAC 110 assumes the source end point of a connection is transmitting a continuous sequence of bytes using a sliding window protocol (the most well known being TCP/IP). A sequence number references the position of a byte in the byte stream with respect to the left edge (or head) of the sliding window. A window is defined by a pair of 32 bit sequence numbers maintained on both connection end points. The Left Edge Sequence Number (LSN) defines the left most edge of the sliding window, and the Right Edge Sequence Number (RSN) defines the right most edge.

While data is being transmitted and acknowledged, the source connection end point will have different values for this pair than the destination end point. Data is transmitted in packets, each of which contains (among other things) a 32 bit sequence number and packet payload length. Together, these two parameters specify the first and last byte positions to which the payload belongs in the byte stream (with respect to the left edge of the sliding window).

As the PE 100 processes the data being staged through the reorder buffer, it generates acknowledgments (ACK's) to be sent back to the source (typically piggy backed on outbound packets) via the Transport Engine 118. The PE 100 may issue an ACK when all the bytes between the sequence number in a new packet and the LSN have been received.

Alternatively, the PE 100 may issue a Selective Acknowledgment (SACK) when the RMAC 110 indicates that all the bytes within any one buffer segment section have been received (this facilitates implementation of the TCP/IP SACK option). Note that a window is defined as: (RSN−LSN+1) if (RSN>LSN), or ($2^{**}32$−LSN+RSN+1) if (LSN>RSN).

An SSA element 1000 consists of a Selective ACK Flag (SACK Flag) 1001 and a 15 bit Data Count 1002 as shown in FIG. 10. A data count represents the number of bytes received into a buffer segment section, less the number of bytes consumed from that section, since the buffer segment was allocated. The SACK flag can be used by the PE 100 to remember that it had issued a SACK for a full segment section. The entire SSA element is set to zero when it is first allocated. The RMAC 110 adds to a data count when it receives a packet transfer request 201 from the PLE 101, and subtracts from a data count when it receives a transfer and advance request 601 from the DMAC 106. The PE 100 sets the SACK flag by issuing a request to the RMAC indicating which SSA element should be updated 405.

The format of a reorder descriptor as used for byte stream reordering is shown in FIG. 11. The reorder descriptor for byte stream reordering 1100 contains the sequence number that defines the left edge of the sliding window (Left Edge Sequence Number or LSN) 1101, the sequence number that defines the right edge of the sliding window (Right Edge Sequence Number or RSN) 1102, a copy of the buffer segment handle corresponding to the LSN (Left Edge BSH or LBH), the first level buffer segment vector handle (Segment Vector Handle or SVH) 1103, a flag that indicates one or two levels of segment vectors are attached to the reorder descriptor 1105, a count of the number of full or complete SSA elements (SSA Count or SSC) 1107, and the reorder descriptor handle itself 1104. It is not necessary to save the reorder descriptor handle in the control store 114, but it is needed in the RSC 112 to provide validation of RSC 112 entries.

When the RMAC 110 receives a packet transfer request 201, it first locates a reorder descriptor to process the request. If the request indicates an RSC hit 206, the RMAC 110 fetches the reorder descriptor from the RSC 112. If the request indicates a miss, the RMAC 110 will fetch a descriptor from the control store 114 using the descriptor handle supplied in the request 208, and load it into the RSC 112. If the handle supplied in the request is NULL, the RMAC 110 fetches one from the RHS 123 and clears the corresponding RSC 112 entry.

Once in possession of a reorder descriptor, the RMAC 110 begins the process of identifying a location in the reorder buffer to deposit the packet payload. In the course of this process, the RMAC 110 may also need to allocate segment vectors and/or buffer segments. Note that all entries in newly allocated reorder structures are zero or NULL.

For all packet transfer requests, the RMAC 110 must navigate down to a byte position in a buffer segment, and update all the corresponding reorder state structures along the way. The information the RMAC 110 needs for this is a function of the sequence number in the request and the Buffer Segment Size parameter in an RMAC Configuration Register located on the HCA. The segment size determines the sequence number bits to be used as an index into the segment vector, the SSA and the buffer segment, as show in FIG. 12 (for a single level of segment vectors).

Figure 13:
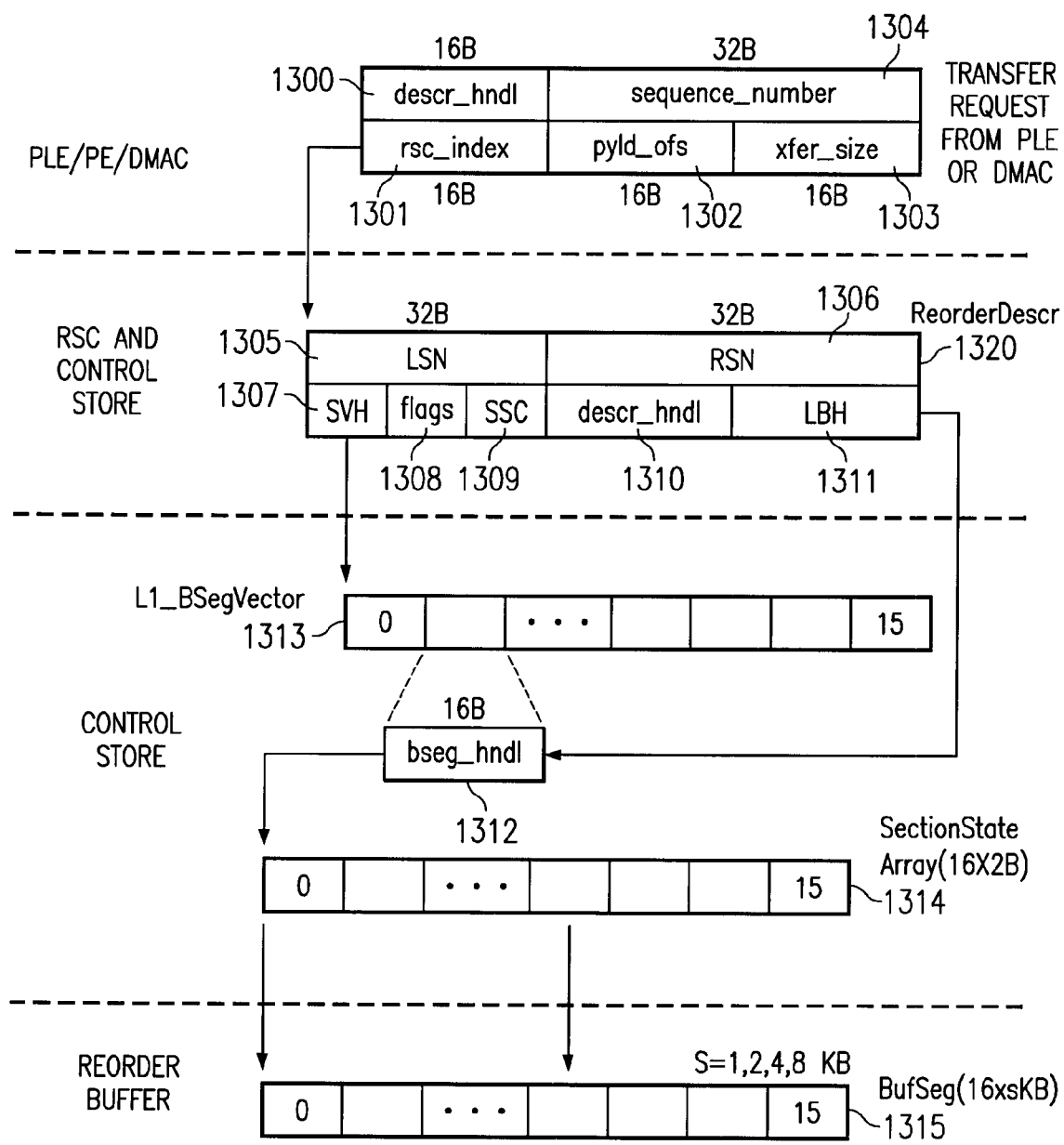
FIG. 13 is an exemplary diagram of an organization of reorder state structures for one level of segment vectors for byte stream reordering.

Referring now to FIG. 13, when a packet first arrives on an idle connection (i.e. one for which no buffer segments are currently allocated), a new segment vector and buffer segment must both be allocated (from the VHS 122 and BHS 121). If a new reorder descriptor was also allocated, then the corresponding RSC entry 1320 must be initialized. In this case, the next expected sequence number (LSN) is supplied by the PLE 101 in the Set Next Expected Sequence Number request 201 that immediately follows the packet transfer request. The RSN field 1306 is set to LSN+transfer size specified in the packet transfer request.

The segment vector and reorder descriptor handles are recorded in the space provided for them in the RSC entry (1307, 1310). The buffer segment handle is recorded in the Left Edge BSH field 1311, and into the indicated slot of the segment vector itself (i.e. CMAC write) 1313. SSA data counts 1314 are updated to reflect the amount of data written to corresponding buffer segment sections 1315. The number of filled SSA elements is recorded in the SSC field of the RSC 1309.

The packet payload is transferred to the indicated position in the buffer segment by issuing sequences of read requests to the DTB 104 and write requests to the reorder buffer interface. As the DTB 104 read responses arrive, the data passed to the reorder buffer write data port 130.

When a packet arrives on an active connection (i.e. one for which buffer segments are currently allocated), a new segment vector 1313 and/or buffer segment 1315 may need to be allocated. If the payload target falls within a currently allocated buffer segment, no new allocations are required. The payload target is defined as a range that begins at the sequence number of the first and last bytes of the packet payload indicated in the packet transfer request 201 (i.e. sequence number to sequence number+transfer size). In this case, the RMAC 110 simply transfers the payload from the DTB 104 to the reorder buffer and updates the appropriate reorder descriptor and SSA fields.

If the payload bound (i.e. sequence number+the transfer size) is outside the range of the current target window (i.e. LSN to RSN), then the RSN field of the RSC entry 1306 is set to the payload bound. SSA data counts are updated to reflect the amount of data written to the corresponding buffer segment sections. The RMAC 110 reads in the effected SSA(s), adds an amount to each SSA element that reflects the amount of data written to the corresponding buffer segment section and writes the results back to control store. The number of filled SSA elements is added to the SSC field of the RSC 112.

If the payload target of a packet transfer request falls within the range of the first level segment vector 1313, but buffer segments have not yet been allocated to the particular segment vector slots to which the payload target maps, new buffer segment(s) are allocated (from the BHS 121). The handle(s) of the buffer segment(s) are written to the indicated segment vector slot(s), and then the packet transfer request can be processed as though the segment(s) had already been allocated.

Figure 15:
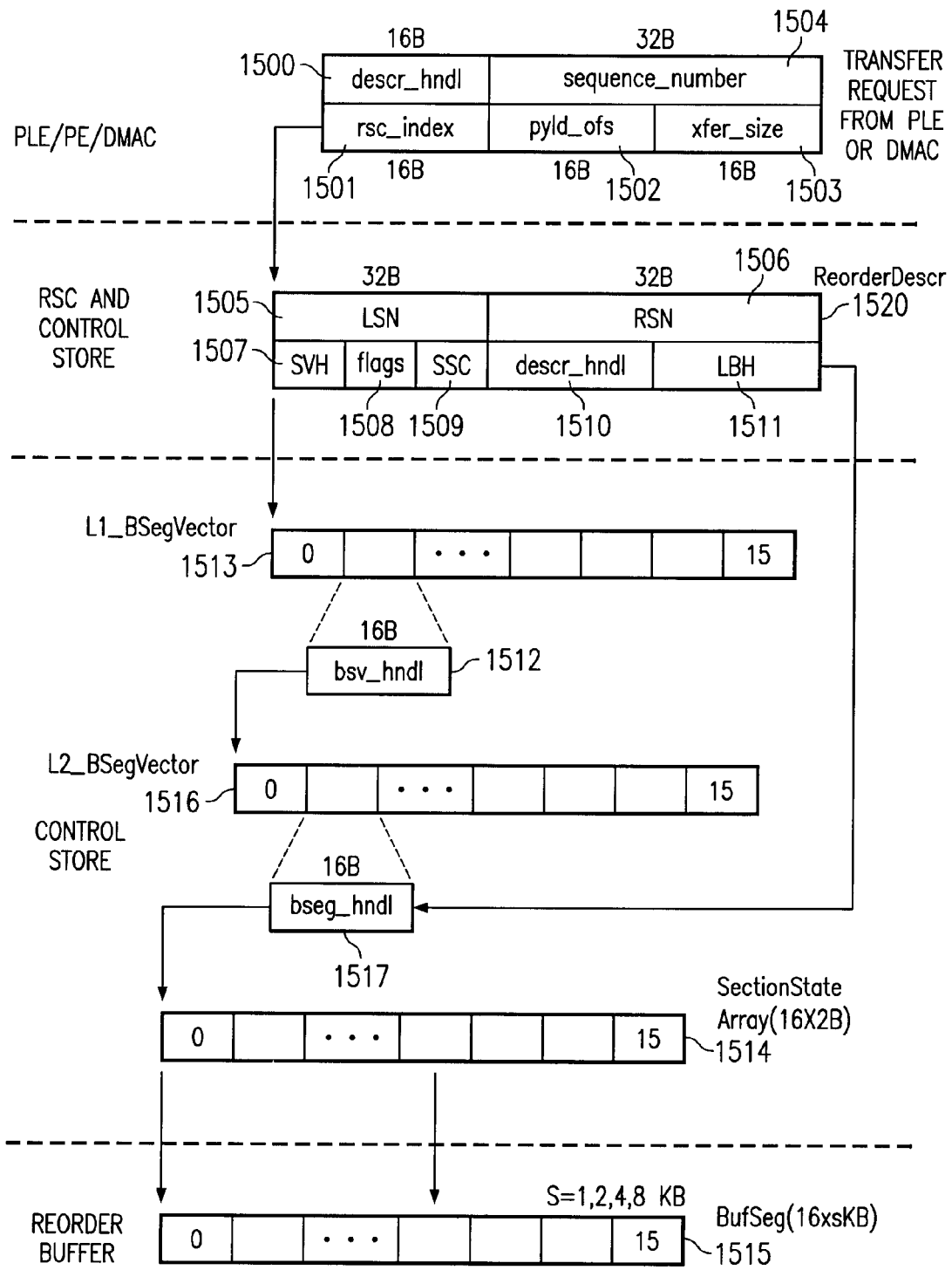
FIG. 15 is an exemplary diagram of an organization of reorder state structures for two levels of segment vectors for byte stream reordering.
Figure 19:
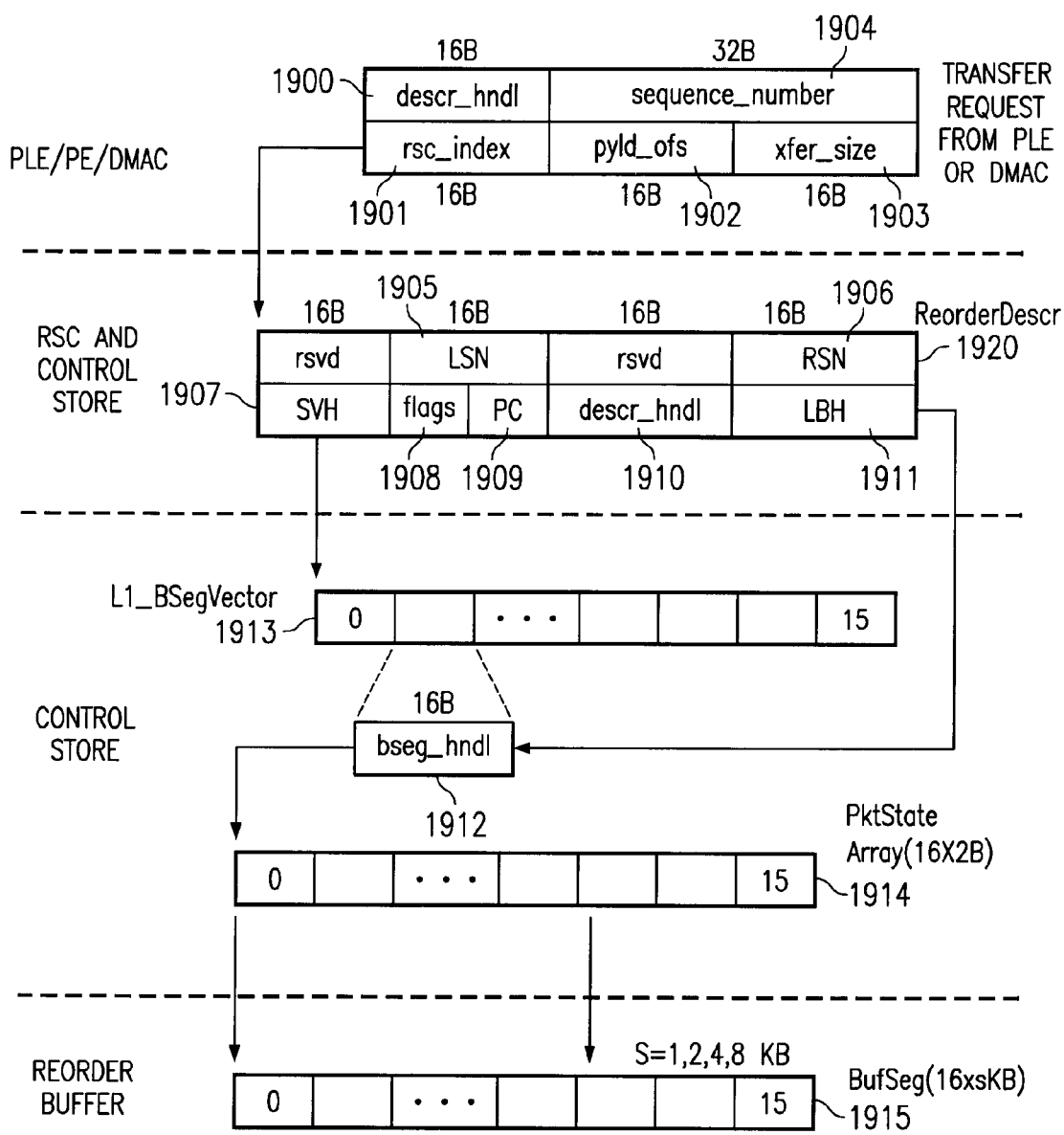
FIG. 19 is an exemplary diagram of an organization of reorder state structures for one level of segment vectors for whole packet reordering.
Figure 20:
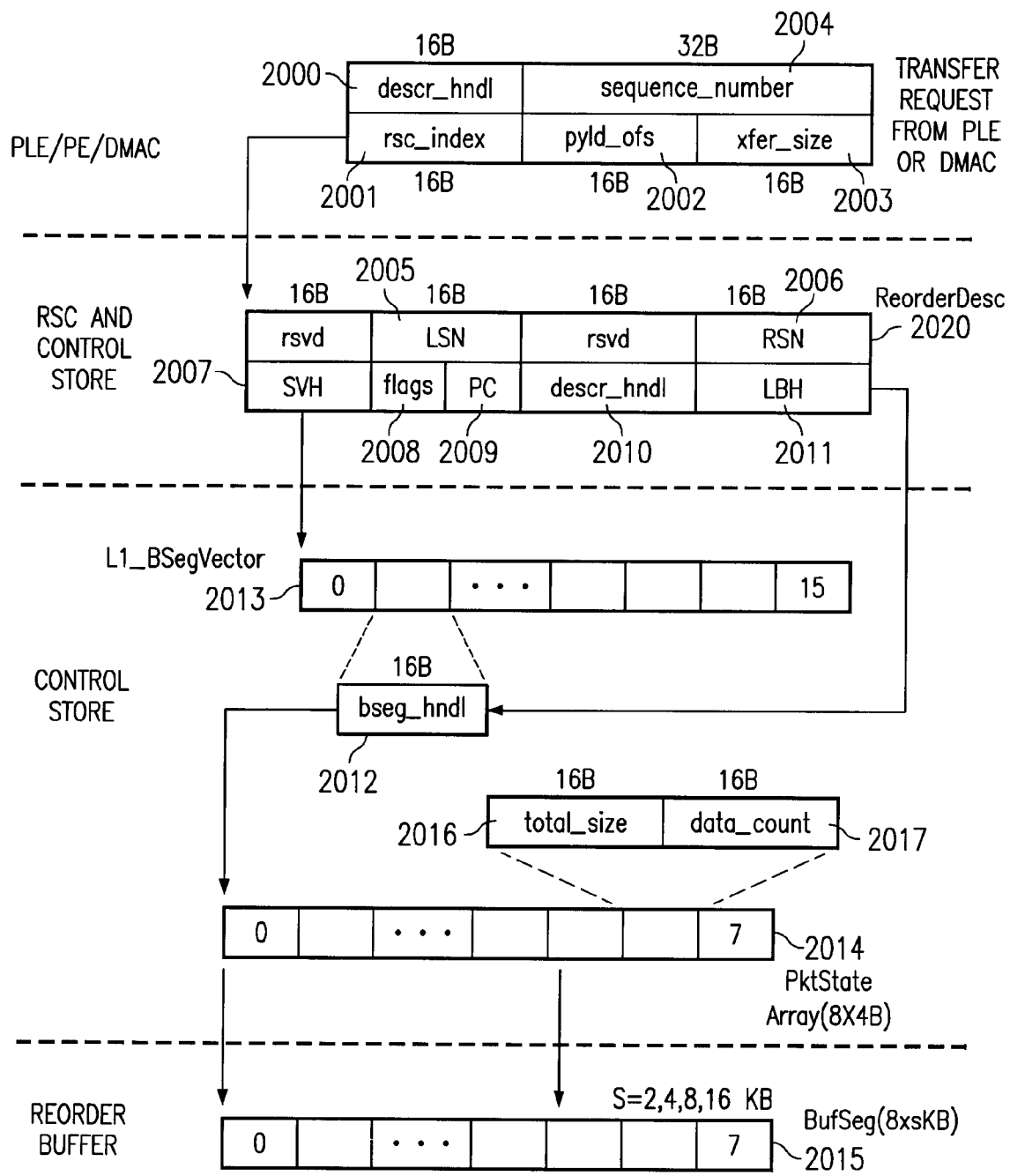
FIG. 20 is an exemplary diagram of an organization of reorder state structures for two levels of segment vectors for whole packet reordering.

The organization of reorder state for two levels of segment vectors is illustrated in FIG. 15. As shown in FIG. 15, if the payload target lands outside the range of the first level segment vector 1513, the RMAC 110 allocates a new segment vector (from the VHS 122) and demotes the first level segment vector to a second level segment vector 1516. To demote a first level segment vector, its handle is written into the some slot of the newly allocated segment vector, and the handle of the newly allocated segment vector is written into the SVH field 1507 of the RSC entry 1520. During the demotion process a second segment vector and buffer segment are allocated. The handle of the second segment vector is written to the slot in the new first level segment vector just to the right of the slot that the demoted segment vector was placed. The handle of the new buffer segment is written into the first slot of the second segment vector. The Segment Levels flag in the RSC entry 1105 is set to indicate two levels of segment vectors. The mapping of the sequence numbers for two levels of segment vectors is shown in FIG. 14.

Once demoted, a segment vector remains at the second level until all the data in all the buffer segments it points to has been consumed. If after that time the target window falls within the range of a single remaining second level segment vector, that segment vector is promoted to the first level. To promote a second level segment vector to the first level, the RMAC 110 simply writes the handle of the segment vector into the SVH field of the RSC entry 1507, and clears the Segment Levels flag in the RSC entry 1105 is set to indicate that the connection has reverted back to using a single level of segment vectors.

Data is consumed from reorder buffer 103 memory as transfer and advance requests 601 are received from the DMAC 106. When the RMAC 110 receives a transfer and advance request, it fetches the LSN from the RSC entry 1101 and uses it to navigate down to the corresponding byte address in the buffer segment (1315, 1515)(the sequence number in the request is ignored). If the reorder descriptor handle in the request 609 doesn't match the one in the RSC entry 1104, the RMAC 110 fetches the reorder descriptor from control store, and updates the RSC 112 with it. To transfer data from the reorder buffer, the RMAC 110 issues read requests to the reorder buffer interface 103 and passes the read data from reorder buffer responses to the write data port of the RMAC/DMAC interface 106. While the RMAC 110 does byte align data transferred to the reorder buffer from the DTB 104, it does not byte align transfers from the reorder buffer to the DMAC 106 (the DMAC byte aligns data from the RMAC 110 while transferring it to host memory).

If the request was a Transfer and Advance 601, the RMAC 110 also updates the reorder state. SSA data counts 1002 are updated to reflect the amount of data read from the corresponding buffer segment sections (1315, 1515). The RMAC 110 reads in the effected SSA(s) (1314, 1514), subtracts an amount from each SSA element that reflects the amount of data read from the corresponding buffer segment section and writes the results back to control store (via the posted write queue on the CMAC write port). The number of emptied SSA elements is subtracted from the SSC field of the RSC entry 1107. The transfer size is added to the LSN of the RSC entry 1101.

If a buffer segment boundary is not crossed, then only the SSC and LSN fields of the RSC entry are updated (1107, 1101). However, if a buffer segment boundary is crossed, further reorder state updates occur. The buffer segment from which all data was just consumed is de-allocated (i.e. its handle is written back to the BHS 121), and the handle of the next consecutive buffer segment handle is recorded in the LBH field of the RSC entry 1108. If the de-allocated buffer segment was the last one in the segment vector (i.e. from the right most segment vector slot), the segment vector is also de-allocated (i.e. its handle is written back to the VHS 122). If the there was just one level of segment vectors, then the SVH and LBH fields of the RSC entry are cleared (1103, 1108). If there were two levels of segment vectors, then the SVH field of the RSC entry 1507 is set to point to the handle of the next consecutive segment vector in the first level segment vector 1513, and the left most buffer segment handle in that segment vector is recorded in the LBH field of the RSC entry 1511.

As noted earlier, if the next consecutive segment vector is the single remaining second level segment vector, that segment vector is promoted to the first level by writing its handle to the SVH field 1507 of the RSC entry and clearing the Segment Levels flag 1508. If on the other hand there is no next consecutive segment vector, then the first level segment vector 1513 is also de-allocated, the SVH and LBH fields of the RSC entry are cleared (1507, 1511), and the Segment Levels flag 1508 is cleared. Note that when a connection becomes idle (i.e. no buffer segments or segment vectors allocated) the LSN and RSN (1505, 1506) will be equal.

Reordering Packets

For packet oriented connections, the RMAC 110 assumes the source end point of a connection is transmitting a continuous sequence of packets using a sliding window protocol. A sequence number references the position of a packet in the packet stream with respect to the left edge of the sliding window. Just as with byte stream reordering, a window is defined by a pair of 16 bit sequence numbers maintained on both connection end points. The Left Edge Sequence Number (LSN) defines the left most edge of the sliding window, and the Right Edge Sequence Number (RSN) defines the right most edge. As the PE 100 processes the data being staged through the reorder buffer 103, it generates acknowledgments to be sent back to the source (typically piggy backed on outbound packets) via the Transport Engine. The PE 100 may issue an ACK when all the packets between the sequence number in a new packet and the LSN have been received. Alternatively, it may issue an ACK for every packet received. Note that a window is still: (RSN−LSN+1) if (RSN>LSN), or (2**16−LSN+RSN+1) if (LSN>RSN).

For packet reordering, the buffer segment is associated with a Packet State Array (PSA) (1914, 2014, 2214, 2314) and each buffer segment section holds exactly one packet. For whole packet reordering, a PSA element is just a 16 bit Total Size. The total size indicates the size of the entire packet that will be received into the corresponding buffer segment section. Total Size is set equal to the Total Size specified in a packet transfer request 212 when the Reorder type is whole packet 204. For fragmented packets, a PSA element 1600 consists of a 16 bit Total Size 1601 and a 16 bit Data Count 1602, as shown in FIG. 16. The total size indicates the size of the entire packet that will be received into the corresponding buffer segment section. Total Size is set equal to the Total Size specified in a packet transfer request 212 when the Reorder type 204 is fragmented packet and the fragment offset 209 is zero.

The entire PSA is set to zero when it is first allocated. The RMAC 110 adds the transfer size to a data count when it receives a packet transfer request from the PLE 101, and subtracts transfer size from a data count when it receives a transfer and advance request from the DMAC 106. Note that for fragmented packets there are 8 instead of 16 PSA slots 2014 and each one corresponds to a buffer segment twice as large as that for whole packets 2015.

The format of a reorder descriptor as used for packet reordering is shown in FIG. 17. The reorder descriptor for packet reordering 1700 is very similar to that used in byte stream reordering. It contains the sequence number that defines the left edge of the sliding window (LSN) 1702, the sequence number that defines the right edge of the sliding window (RSN) 1704, a copy of the buffer segment handle corresponding to the LSN (LBH) 1710, the first level buffer segment vector handle (SVH) 1705, a flag that indicates one or two levels of segment vectors are attached to the reorder descriptor 1707, a count of the number of full or complete PSA elements (PC) 1709, and the reorder descriptor handle itself 1706.

When the RMAC 110 receives a packet transfer request 200, it first locates a reorder descriptor to process the request. If the request indicates an RSC hit 206, the RMAC 110 fetches the reorder descriptor from the RSC 112. If the request indicates a miss, the RMAC 110 will fetch a descriptor from the control store 114 using the descriptor handle supplied in the request 208, and load it into the RSC 112. If the handle supplied in the request is NULL, the RMAC 110 fetches one from the RHS 123 and clears the corresponding RSC entry.

Once in possession of a reorder descriptor, the RMAC 110 begins the process of identifying a location in the reorder buffer 103 to deposit the packet or packet payload. In the course of this process, the RMAC 110 may also need to allocate segment vectors and/or buffer segments. Note that all entries in newly allocated reorder structures are zero or NULL. For all packet transfer requests, the RMAC 110 must navigate down to a packet slot in a buffer segment, and update all the corresponding reorder state structures along the way. The information the RMAC 110 needs for this is a function of the sequence number 211 and reorder type indicated in the request 204, as show in FIG. 18 (for a single level of segment vectors).

When a packet first arrives on an idle connection (i.e. one for which no buffer segments are currently allocated), a new segment vector and buffer segment must both be allocated (from the VHS 122 and BHS 121). If a new reorder descriptor was also allocated, then the corresponding RSC entry must be initialized. In this case, the next expected sequence number (LSN) is supplied by the PLE 101 in the Set Next Expected Sequence Number request 201 that immediately follows the packet transfer request. The RSN field 2006 is set equal to LSN 2005. The segment vector and reorder descriptor handles are recorded in the space provided for them in the RSC entry (2007, 2010). The buffer segment handle is recorded in the LBH field 2020, and into the indicated slot of the segment vector itself 2013 (i.e. CMAC write). The indicated PSA data count 2017 is updated to reflect the amount of data written to the corresponding buffer segment section (for fragmented packets). The indicated PSA Total Size field 2016 is set equal to the Total Size indicated in the packet transfer request 212.

For a fragmented packet, this only occurs when the fragment offset 209 in the packet transfer request is zero. The Packet Count in the RSC entry is set to one for a whole packet transfer 1909, and left at zero for a fragmented packet 2009. For a whole packet or the first fragment of a fragmented packet, the entire packet or packet fragment is transferred to the indicated section in the buffer segment (starting at the first byte position of the section) by issuing sequences of read requests to the DTB 104 and write requests to the reorder buffer interface 103. As the DTB 104 read responses arrive the data is passed to the reorder buffer write data port.

For packet fragments other than the first (i.e. fragment offset is non-zero), only the payload is transferred. The offset of the payload in the DTB slot is specified in the payload offset parameter of the request 202. The offset from the head of the buffer segment section to which the data is transferred is given by the fragment offset in the packet transfer request 209.

When a packet arrives on an active connection (i.e. one for which buffer segments are currently allocated), a new segment vector and/or buffer segment may need to be allocated. If the sequence number falls within a currently allocated buffer segment, no new allocations are required. In this case, the RMAC 110 simply transfers the payload from the DTB 104 to the reorder buffer 103 and updates the appropriate reorder descriptor and PSA fields. If the sequence number is outside the range of the current target window (i.e. LSN to RSN), then the RSN field of the RSC 2006 is set to the payload bound. The indicated PSA data count 2017 is updated to reflect the amount of data written to the corresponding buffer segment section (for fragmented packets). The indicated PSA Total Size field 2016 is set equal to the Total Size indicated in the packet transfer request 212.

For a fragmented packet, this only occurs when the fragment offset 209 in the packet transfer request is zero. For whole packets, the PC field of the RSC entry 1909 is incremented. For fragmented packets, the PC 2009 is only incremented when the data count 2017 becomes equal to the total size 2016. The reorder processing thus far described is illustrated for whole packets in FIG. 19, and for fragmented packets in FIG. 20.

If the sequence number of a packet transfer request 211 falls within the range of the first level segment vector 2013, but a buffer segment has not yet been allocated to the particular segment vector slot to which the sequence number maps, a new buffer segment is allocated (from the BHS 121). The handle of the buffer segment is written to the indicated segment vector slot, and then the packet transfer request can be processed as though the segment had already been allocated. If the sequence number lands outside the range of the first level segment vector, the RMAC 110 allocates a new segment vector (from the VHS 122) and demotes the first level segment vector to a second level segment vector.

Figure 22:
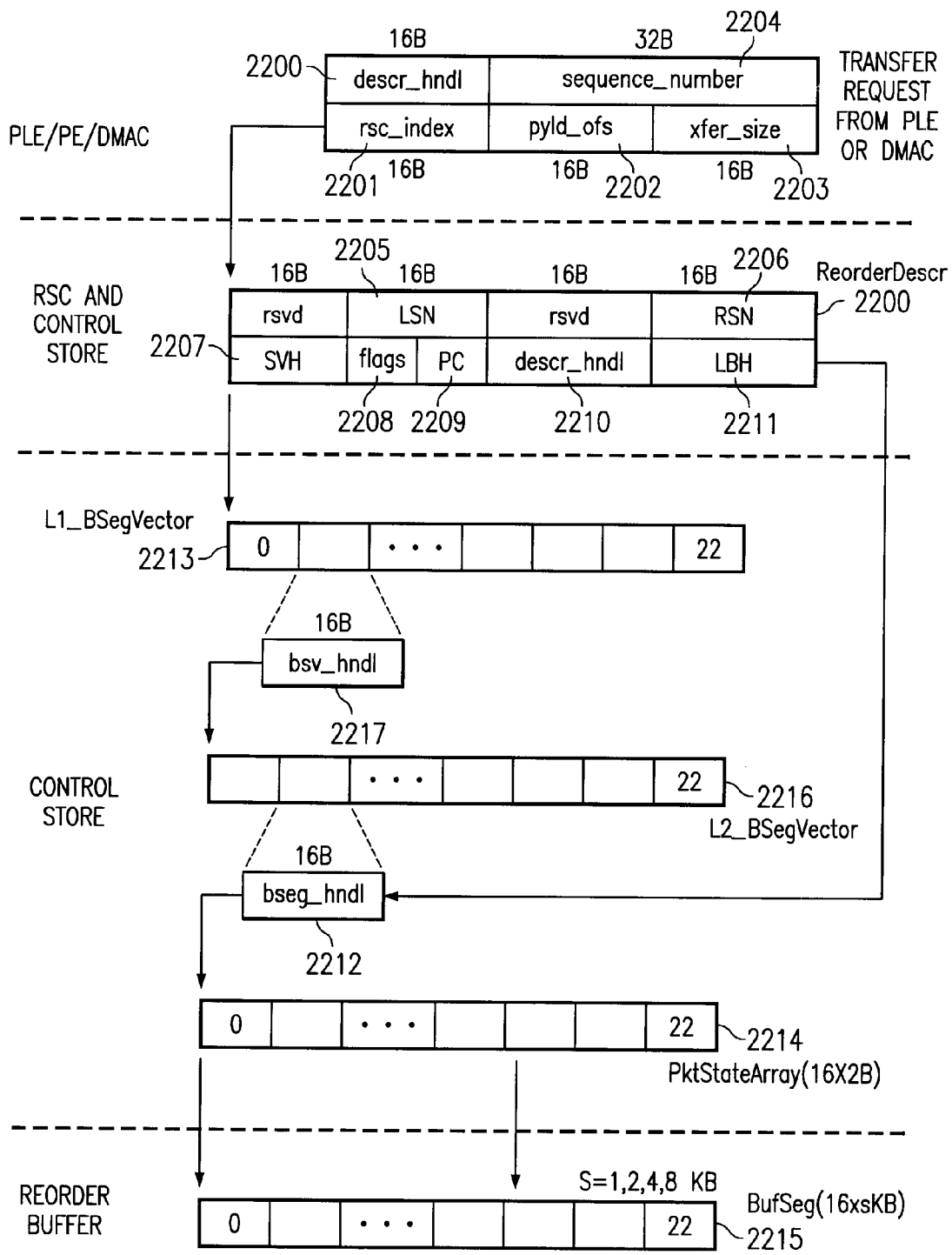
FIG. 22 is an exemplary diagram of an organization of reorder state structures for two levels of segment vectors for whole packet reordering.
Figure 23:
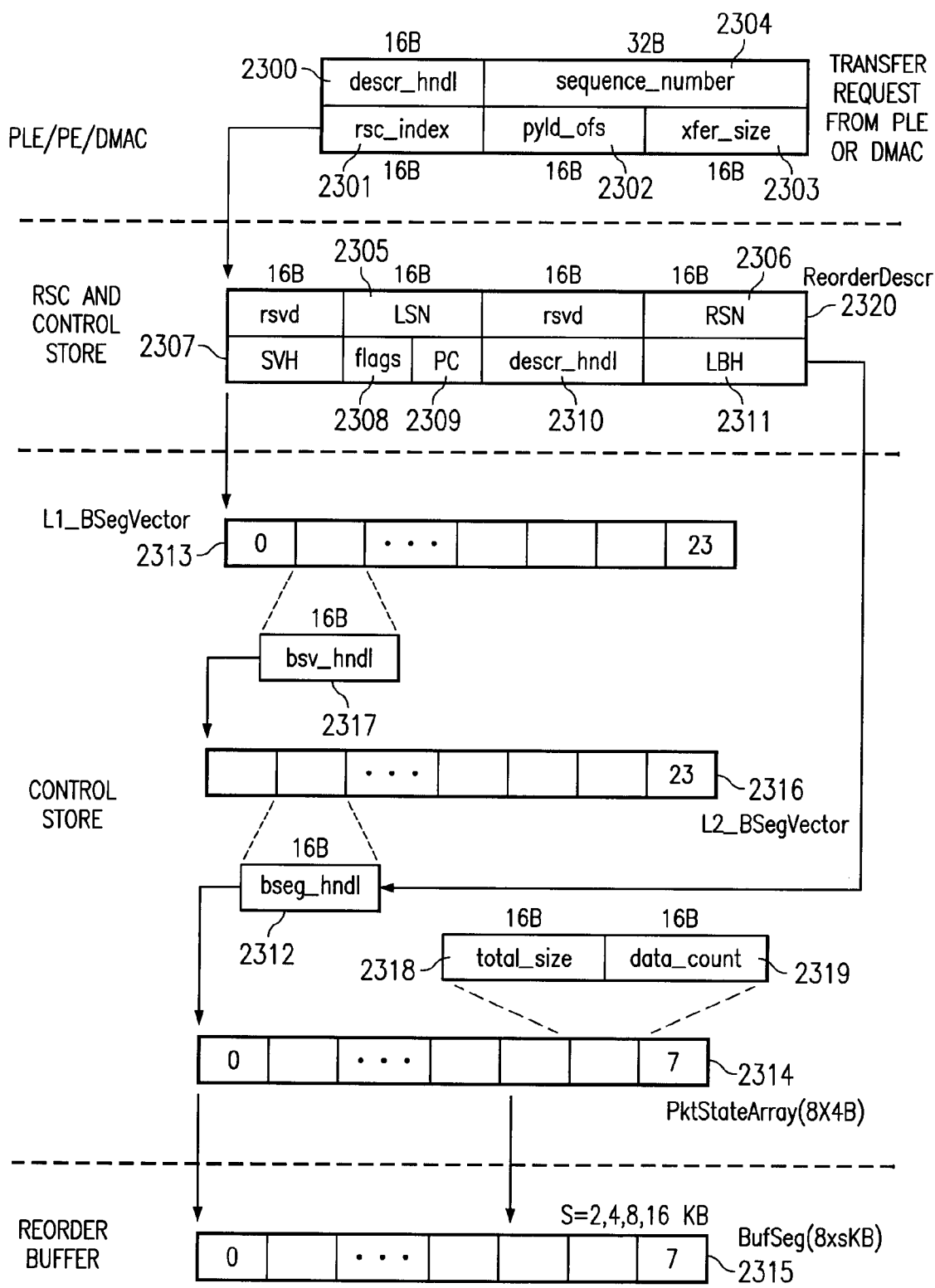
FIG. 23 is an exemplary diagram of an organization of reorder state structures for two levels of segment vectors for fragmented packet reordering.

The organization of reorder state for two levels of segment vectors for whole packets is illustrated in FIG. 22, and for fragmented packets in FIG. 23. Demoting a first level segment vector for packet reordering is essentially the same as with byte stream reordering. To review, the handle of the first level segment vector is written into a slot of the newly allocated segment vector 2213, and the handle of the newly allocated segment vector is written into the SVH field of the RSC entry 2207. During the demotion process a second segment vector and buffer segment are allocated. The handle of the second segment vector is written to the slot in the new first level segment vector just to the right of the slot that the demoted segment vector was placed. The handle of the new buffer segment is written into the first slot of the second segment vector. The Segment Levels flag in the RSC entry 2208 is set to indicate two levels of segment vectors. The mapping of the sequence numbers for two levels of segment vectors is shown in FIG. 21.

Once demoted, a segment vector remains at the second level until all the data in all the buffer segments it points to has been consumed. If after that time the sequence number falls within the range of a single remaining second level segment vector, that segment vector is promoted to the first level. Promoting a second level segment vector to the first level for packet reordering is essentially the same as for byte stream reordering. The RMAC 110 simply writes the handle of the segment vector into the SVH field of the RSC entry 2207, and clears the Segment Levels flag in the RSC 2208 to indicate that the connection has reverted back to using a single level of segment vectors.

Data is consumed from reorder memory as transfer and advance requests are received from the DMAC 600. When the RMAC 110 receives a transfer and advance request, it fetches the LSN from the RSC entry 1702 and uses it to navigate down to the corresponding section of the buffer segment (the sequence number in the request is ignored). If the reorder descriptor handle in the request 609 doesn't match the one in the RSC entry 1706, the RMAC 110 fetches the reorder descriptor from the control store 114, and updates the RSC 112 with it. To transfer data from the reorder buffer, the RMAC 110 issues read requests to the reorder buffer interface and passes the read data from reorder buffer responses to the write data port of the RMAC/DMAC interface.

If the request was a transfer and advance request, the RMAC 110 also decrements the Packet Count 1709 and increments the LSN in the RSC entry 1702. If a buffer segment boundary is not crossed, then only the PC and LSN fields of the RSC entry are updated. However, if a buffer segment boundary is crossed, further reorder state updates occur. The buffer segment from which all data was just consumed is de-allocated (i.e. its handle is written back to the BHS 121), and the handle of the next consecutive buffer segment handle is recorded in the LBH field of the RSC entry 1710. If the de-allocated buffer segment was the last one in the segment vector (i.e. from the right most segment vector slot), the segment vector is also de-allocated.

If there was just one level of segment vectors, then the SVH and LBH fields of the RSC entry are cleared (1705, 1710). If there were two levels of segment vectors, then the SVH field of the RSC entry 2207 is set to point to the handle of the next consecutive segment vector in the first level segment vector 2213, and the left most buffer segment handle in that segment vector is recorded in the LBH field of the RSC entry 2211. As noted earlier, if the next consecutive segment vector is the single remaining second level segment vector, that segment vector is promoted to the first level by writing its handle to the SVH field of the RSC entry 2207 and clearing the Segment Levels flag 2208. If on the other hand there is no next consecutive segment vector, then the first level segment is also de-allocated, the SVH and LBH fields of the RSC entry are cleared, and the Segment Levels flag is cleared. Note that when a connection becomes idle (i.e. no buffer segments or segment vectors allocated) the LSN and RSN will be equal (2205, 2206).

What is claimed is:

1. A method, in a data processing system, of reordering data of a data transmission received from a source device, comprising:

receiving, in a data transfer buffer, a data packet transmitted over a connection associated with the source device;

determining if the connection requires reordering of data packets;

transferring the data packet from the data transfer buffer to a reorder buffer if the connection requires reordering of data packets; and updating a reorder state cache to reflect the transfer of the data packet to the reorder buffer.

2. The method of claim 1, further comprising:

receiving a request to transfer data to a host memory;

fetching a next data packet sequence number from the reorder state cache;

identifying a position in the reorder buffer of the data associated with the next data packet sequence number entry; and transferring the data at the identified position to the host memory.

3. The method of claim 2, wherein identifying a position in the reorder buffer of the data includes identifying a byte address in a buffer segment of the reorder buffer where the data is located.

4. The method of claim 2, wherein transferring the data at the identified position to the host memory includes issuing a read request to a reorder buffer interface associated with the reorder buffer and passing the data from the reorder buffer to a write data port of a direct memory access controller interface associated with the host memory.

5. The method of claim 2, further comprising updating the reorder state in the reorder state cache in response to the transfer of the data from the reorder buffer to the host memory.

6. The method of claim 2, further comprising:

sending the next expected sequence number to a pre-load engine; and pre-loading context information of the connection into a protocol engine, if a sequence number of a data packet currently being handled by the pre-load engine corresponds with the next expected sequence number.

7. The method of claim 2, wherein the request to transfer data to a host memory is received from a protocol engine based on a policy implemented by the protocol engine.

8. The method of claim 1, further comprising:

searching a channel mapping cache for a connection context for the connection; and sending a request for the connection context to a control store if the connection context is not found in the channel mapping cache.

9. The method of claim 1, wherein transferring the data packet from the data transfer buffer to a reorder buffer includes sending a request to a control store for reorder state information for a connection if the reorder state information for the connection is not in the reorder state cache.

10. The method of claim 1, wherein transferring the data packet from the data transfer buffer to a reorder buffer includes obtaining reorder state information from the reorder state cache.

11. The method of claim 1, wherein transferring the data packet from the data transfer buffer to the reorder buffer includes:

receiving a packet transfer request from a pre-load engine; and locating a reorder descriptor to process the transfer request based on a reorder descriptor handle included in the packet transfer request.

12. The method of claim 11, wherein locating a reorder descriptor includes fetching the reorder descriptor from the reorder state cache based on the reorder descriptor handle in the transfer request received from the pre-load engine.

13. The method of claim 12, wherein locating a reorder descriptor further includes fetching the reorder descriptor from a control store using the reorder descriptor handle in the transfer request received from the pre-load engine, if the reorder descriptor is not in the reorder state cache.

14. The method of claim 11, wherein locating a reorder descriptor includes:

allocating a new reorder descriptor handle from a reorder descriptor handle stack if the reorder descriptor handle in the transfer request is null; and clearing an entry corresponding to the new reorder descriptor handle in the reorder state cache.

15. The method of claim 1, further comprising:

maintaining a dynamically allocated data structure for identifying a state of reorder buffer space currently allocated on a per connection basis in a control store.

16. The method of claim 15, wherein a portion of the dynamically allocated data structure is cached in the reorder state cache.

17. The method of claim 15, wherein the dynamically allocated data structure includes a reorder descriptor that includes a buffer segment vector handle that identifies a buffer segment in the reorder buffer and an identifier of a state array in the control store.

18. The method of claim 15, wherein the dynamically allocated data structure includes at least one of a buffer handle stack, a vector handle stack, a reorder handle stack, a reorder descriptor table, and a connection context.

19. The method of claim 16, wherein the reorder state cache includes at least one of a reorder descriptor handle cache, a vector handle cache, and a buffer segment handle cache.

20. A system for reordering data of a data transmission received from a source device, comprising:
- a data transfer buffer that receives a data packet transmitted over a connection associated with the source device; and
- a reorder memory access controller that determines if the connection requires reordering of data packets and transfers the data packet from the data transfer buffer to a reorder buffer if the connection requires reordering of data packets, and updates a reorder state cache to reflect the transfer of the data packet to the reorder buffer.

21. The system of claim 20, further comprising:
- means for receiving a request to transfer data to a host memory;
- means for fetching a next data packet sequence number from the reorder state cache;
- means for identifying a position in the reorder buffer of the data associated with the next data packet sequence number entry; and
- means for transferring the data at the identified position to the host memory.

22. The system of claim 20, further comprising:
- a pre-load engine, wherein the pre-load engine sends a packet transfer request and a reorder descriptor is located to process the transfer request based on a reorder descriptor handle included in the packet transfer request.

23. The system of claim 20, the reorder memory access controller transfers the data packet from the data transfer buffer to a reorder buffer based on reorder state information obtained from the reorder state cache.

24. The system of claim 20, wherein transferring the data packet from the data transfer buffer to a reorder buffer includes sending a request to a control store for reorder state information for a connection if the reorder state information for the connection is not in the reorder state cache.

25. The system of claim 20, further comprising:
- a control store that maintains a dynamically allocated data structure for identifying a state of reorder buffer space currently allocated on a per connection basis.

26. The system of claim 20, further comprising:
- a channel mapping cache; and
- a control store, wherein the reorder memory access controller searches the channel mapping cache for a connection context for the connection, and wherein, if the connection context is not found in the channel mapping cache, the reorder memory access controller sends a request for the connection context to the control store.

27. An apparatus for reordering data of a data transmission received from a source device, comprising:
- means for receiving a data packet transmitted over a connection associated with the source device;
- means for determining if the connection requires reordering of data packets;
- means for transferring the data packet from the data transfer buffer to a reorder buffer if the connection requires reordering of data packets; and
- means for updating a reorder state cache to reflect the transfer of the data packet to the reorder buffer.

28. The apparatus of claim 27, further comprising:
- means for receiving a request to transfer data to a host memory;
- means for fetching a next data packet sequence number from the reorder state cache;
- means for identifying a position in the reorder buffer of the data associated with the next data packet sequence number entry; and
- means for transferring the data at the identified position to the host memory.

29. The apparatus of claim 27, wherein the means for transferring the data packet from the data transfer buffer to a reorder buffer includes means for obtaining reorder state information from the reorder state cache.

30. The apparatus of claim 27, wherein the means for transferring the data packet from the data transfer buffer to a reorder buffer includes means for sending a request to a control store for reorder state information for a connection if the reorder state information for the connection is not in the reorder state cache.

31. The apparatus of claim 27, further comprising:
- means for maintaining a dynamically allocated data structure for identifying a state of reorder buffer space currently allocated on a per connection basis in a control store.

32. A computer program product in a computer readable medium for reordering data of a data transmission received from a source device, comprising:
- first instructions for receiving a data packet transmitted over a connection associated with the source device;
- second instructions for determining if the connection requires reordering of data packets;
- third instructions for transferring the data packet from the data transfer buffer to a reorder buffer if the connection requires reordering of data packets; and
- fourth instructions for updating a reorder state cache to reflect the transfer of the data packet to the reorder buffer.

33. The computer program product of claim 32, further comprising:
- fifth instructions for receiving a request to transfer data to a host memory;
- sixth instructions for fetching a next data packet sequence number from the reorder state cache;
- seventh instructions for identifying a position in the reorder buffer of the data associated with the next data packet sequence number entry; and
- eighth instructions for transferring the data at the identified position to the host memory.

* * * * *